United States Patent
Washburn et al.

(10) Patent No.: US 9,914,870 B2
(45) Date of Patent: Mar. 13, 2018

(54) LIGNIN-CONTAINING POLYMERS AND COMPOSITIONS INCLUDING LIGNIN-CONTAINING POLYMERS

(71) Applicant: CARNEGIE MELLON UNIVERSITY, Pittsburgh, PA (US)

(72) Inventors: Newell R. Washburn, Pittsburgh, PA (US); Hoyong Chung, Tallahassee, FL (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 0 days.

(21) Appl. No.: 14/762,332

(22) PCT Filed: Jan. 22, 2014

(86) PCT No.: PCT/US2014/012505
§ 371 (c)(1),
(2) Date: Jul. 21, 2015

(87) PCT Pub. No.: WO2014/116672
PCT Pub. Date: Jul. 31, 2014

(65) Prior Publication Data
US 2015/0368546 A1    Dec. 24, 2015

Related U.S. Application Data

(60) Provisional application No. 61/849,233, filed on Jan. 22, 2013, provisional application No. 61/962,059, filed on Oct. 30, 2013.

(51) Int. Cl.
C09K 8/588    (2006.01)
C08K 3/04    (2006.01)
(Continued)

(52) U.S. Cl.
CPC ............ *C09K 8/588* (2013.01); *C08F 251/02* (2013.01); *C08F 291/04* (2013.01);
(Continued)

(58) Field of Classification Search
None
See application file for complete search history.

(56) References Cited

U.S. PATENT DOCUMENTS 4,889,902 A    12/1989 Meister
4,891,404 A    1/1990 Narayan
(Continued)

FOREIGN PATENT DOCUMENTS

WO    WO2004087777 A2    10/2004
WO    WO2005087818 A1    9/2005
(Continued)

OTHER PUBLICATIONS

Chen, R. et al., Graft Copolymerization of Lignosulfonate and Styrene, Journal of Applied Polymer Science, vol. 24, 1609-1618 (1979).
(Continued)

*Primary Examiner* — Jeffrey Washville
(74) *Attorney, Agent, or Firm* — Bartony & Associates, LLC

(57) ABSTRACT

A composition includes an agent formed by grafting at least a first polymer with lignin and a component other than the agent, lignin or the at least a first polymer, wherein lignin has an affinity for the component. A method of dispersing a component in a matrix includes adding an agent to the matrix. The agent is formed by grafting at least a first polymer with lignin. The first polymer has an affinity for the matrix. Lignin has an affinity for the component. The
(Continued)

component is other than the agent, lignin or the at least a first polymer. The method for includes contacting the matrix with the component.

11 Claims, 19 Drawing Sheets

(51) Int. Cl.
*C08H 7/00* (2011.01)
*C08F 251/02* (2006.01)
*C08F 291/04* (2006.01)
*C08F 293/00* (2006.01)
*C08G 81/02* (2006.01)

(52) U.S. Cl.
CPC .......... *C08F 293/005* (2013.01); *C08G 81/02* (2013.01); *C08H 6/00* (2013.01); *C08K 3/04* (2013.01); *C08F 2438/01* (2013.01)

(56) References Cited

U.S. PATENT DOCUMENTS

| | | | |
|---|---|---|---|
| 4,891,415 A | 1/1990 | Lin | |
| 4,977,227 A | 12/1990 | Negami | |
| 4,990,270 A | 2/1991 | Meister | |
| 5,037,931 A | 8/1991 | Meister | |
| 5,230,814 A | 7/1993 | Naae | |
| 5,608,040 A | 3/1997 | Huttermann | |
| 5,763,546 A | 6/1998 | Jung | |
| 5,789,487 A | 8/1998 | Matyjaszewski | |
| 5,807,937 A | 9/1998 | Matyjaszewski | |
| 5,945,491 A | 8/1999 | Matyjaszewski | |
| 6,111,022 A | 8/2000 | Matyjaszewski | |
| 6,121,371 A | 9/2000 | Matyjaszewski | |
| 6,124,411 A | 9/2000 | Matyjaszewski | |
| 6,162,882 A | 12/2000 | Matyjaszewski | |
| 6,407,187 B1 | 6/2002 | Matyjaszewski | |
| 6,512,060 B1 | 1/2003 | Matyjaszewski | |
| 6,593,460 B1 | 7/2003 | Huttermann | |
| 6,624,262 B2 | 9/2003 | Matyjaszewski | |
| 6,627,314 B2 | 9/2003 | Matyjaszewski | |
| 6,790,919 B2 | 9/2004 | Matyjaszewski | |
| 7,019,082 B2 | 3/2006 | Matyjaszewski | |
| 7,049,373 B2 | 5/2006 | Matyjaszewski | |
| 7,064,166 B2 | 6/2006 | Matyjaszewski | |
| 7,157,530 B2 | 1/2007 | Matyjaszewski | |
| 7,691,982 B2 | 4/2010 | Tomita | |
| 7,825,199 B1 | 11/2010 | Matyjaszewski | |
| 2003/0230407 A1 | 12/2003 | Vijn | |
| 2007/0260046 A1* | 11/2007 | Tomita | B01F 17/0028 530/500 |
| 2008/0217013 A1* | 9/2008 | Stokes | C07C 29/76 166/300 |
| 2009/0054611 A1 | 2/2009 | Jones | |
| 2011/0124847 A1 | 5/2011 | Chen | |
| 2011/0159768 A1* | 6/2011 | Crescimanno | C08F 269/00 442/327 |
| 2013/0096285 A1 | 4/2013 | Qiu | |
| 2013/0274150 A1 | 10/2013 | Holt | |
| 2013/0281582 A1 | 10/2013 | Dorgan | |
| 2014/0080992 A1 | 3/2014 | Olsson | |
| 2015/0158898 A1 | 6/2015 | Adam | |
| 2015/0166836 A1 | 6/2015 | Liu | |

FOREIGN PATENT DOCUMENTS

| | | |
|---|---|---|
| WO | WO2005087819 A1 | 9/2005 |
| WO | WO2007025086 A2 | 3/2007 |
| WO | WO2007075817 A1 | 7/2007 |
| WO | WO2014116672 A1 | 7/2014 |
| WO | WO2015117106 | 8/2015 |

OTHER PUBLICATIONS

Chen, R. L., et al. Some Water-Soluble Copolymers from Lignin, Journal of Applied Polymer Science, vol. 32, 4815-4826 (1986).
Aso, Tomohiro et al. Preparation of Novel Lignin-Based Cement Dispersants from Isolated Lignins, Journal of Wood Chemistry and Technology, 33:286-298, 2013.
Pucciariello, Rachele et al., Physical properties of straw lignin-based polymer blends, Polymer 45 (2004) 4159-4169.
Willer De Oliveira et al., Multiphase Materials with lignin. XIV. Star-like Copolymers with Styrene, Journal of Wood Chemistry and technology, 14(1), (1994), 119-126.
Ciemniecki, Scott L. et al., Multiphase materials with lignin: 1. Blends of hydroxypropyl lignin with poly(methyl methacrylate), Polymer, 1988, vol. 29, 1021-1029.
Kim, Yong Sik et al., Preparation of a Thermoresponsive Lignin-Based Biomaterial through Atom Transfer Radical Polymerization, Biomacromolecules 2010, 11, 981-988.
Homma, Harumi et al., Conversion of Technical Lignins to Amphiphilic Derivatives with high Surface Activity, Journal of Wood Chemistry and Technology, 30: 2010, 164-174.
Jifu Wang, et al. Combining Renewable Gum Rosin and Lignin: Towards Hydrophobic Polymer Composites by Controlled Polymerization, Journal of Polymer Science part A: Polymer Chemistry (2011), 3728-3738.
Sailaja, Rrn, Low density polyethylene and grafted lignin polyblends using epoxy-functionalized compatibilizer: mechanical and thermal properties, Polymer International, 54:1589-1598 (2005).
Cole, Barbara J. W. et al, Modification of High-Yield Pulps with Polyethylene Glycols. I. Model Compound and Isolated Lignin Studies, Journal of Wood Chemistry and Technology, 13:1, 59-72.
Homma, Harumi et al, Preparation and Characterization of Amphiphilic Lignin Derivatives as Surfactants, 28:4, 270-282.

* cited by examiner

Fig. 7A
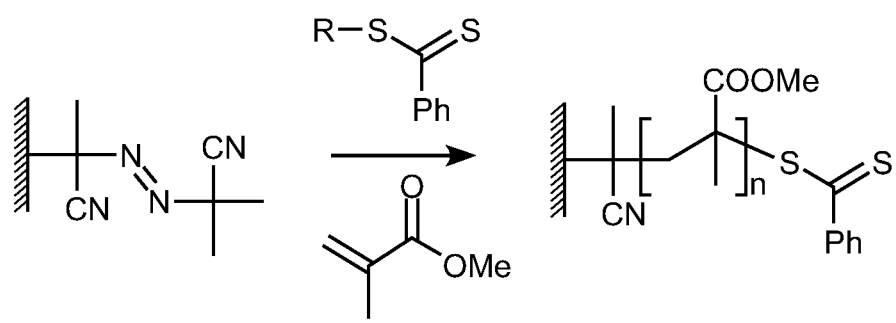
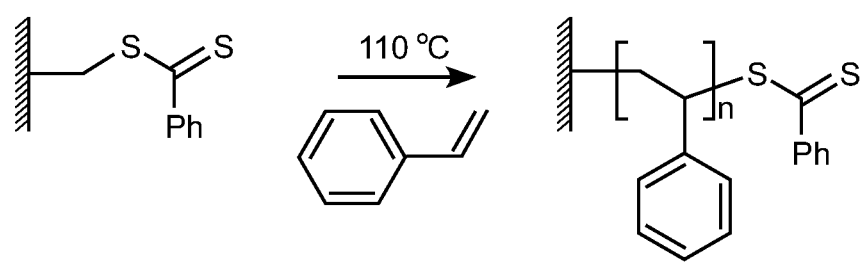
Fig. 7B

LIGNIN-CONTAINING POLYMERS AND COMPOSITIONS INCLUDING LIGNIN-CONTAINING POLYMERS

CROSS-REFERENCE TO RELATED APPLICATION

This application is a US National Phase of the International PCT patent application number: PCT/US2014/012505 filed on Jan. 22, 2014, which claims benefit of U.S. Provisional Patent Application Ser. No. 61/849,233, filed Jan. 22, 2013 and U.S. Provisional Patent Application Ser. No. 61/962,059, filed Oct. 30, 2013, the disclosures of which are incorporated herein by reference.

BACKGROUND

The following information is provided to assist the reader in understanding technologies disclosed below and the environment in which such technologies may typically be used. The terms used herein are not intended to be limited to any particular narrow interpretation unless clearly stated otherwise in this document. References set forth herein may facilitate understanding of the technologies or the background thereof. The disclosure of all references cited herein are incorporated by reference.

Lignin is an abundant phenolic polymer found in nature and therefore is a potential sustainable building block of industrial materials. Indeed, lignin is a complex biopolymer that is a key structural component of woody plants. Purified lignin is generated in large quantities by, for example, the pulp and paper industry but it is not used extensively in modern materials because of its low reactivity and poor processibility. Moreover, the incorporation of lignin into a number of material has resulted in inconsistent material properties. Nonetheless, a goal for the effective handling of lignin waste involves the formation of lignin-based materials. For decades, these materials have been a source of interest because lignin is a natural, renewable source of carbon. Engineering uses for waste materials into high-performance materials would positively affect the environmental cost of producing these materials.

SUMMARY

In one aspect, a composition includes an agent formed by grafting at least a first polymer with lignin and a component other than the agent, lignin or the at least a first polymer, wherein lignin has an affinity for the component. Lignin may, for example, interacts with the component. For example, lignin may provide interfacial adhesion with the component.

In a number of embodiments, the at least a first polymer is formed via controlled radical polymerization. For example, the at least a first polymer may be formed via atom transfer radical polymerization (ATRP), nitroxide-mediated polymerization (NMP), reversible addition fragmentation chain transfer (RAFT) and catalytic chain transfer (CCT), ring-opening polymerization (ROP) or ring-opening metathesis polymerization (ROMP). The at least a first polymer may, for example, be grafted from the lignin of the agent or grafted to the lignin of the agent.

In a number of embodiments, the agent is formed by grafting at least one other polymer to the lignin, wherein the at least a first polymer is formed from one or more monomers and the at least one other polymer is formed from the one or more monomers. The at least one other polymer may alternatively be formed from one or more monomers that are different from one or more monomers forming the at least a first polymer.

In a number of embodiments, the composition is dispersed within a polymeric matrix and the component comprises an additive. The additive may, for example, include a filler or a reinforcer. In a number of embodiments, the additive includes or is carbon.

The at least a first polymer may, for example, be miscible with the polymeric matrix or compatible the polymeric matrix. The at least a first polymer may formed from one or more monomers, and the polymeric matrix may include at least a second polymer which is formed from the one or more monomers. The at least a second polymer may alternatively be formed from one or more monomers that are different from one or more monomers forming the at least a first polymer.

In a number of embodiments, the composition functions as a binder for the component. The at least a first polymer may, for example, be a thermoplastic.

In a number of embodiments where the compositions functions as a binder, the component includes or is carbon. For example, the component may carbon fiber.

The composition may further includes a non-polymeric matrix in which the agent and the component are distributed. The non-polymeric matrix may, for example, be a solid matrix, a liquid matrix or a multiphase matrix.

In a number of embodiments, the non-polymeric matrix is an aqueous matrix, and the at least a first polymer is a hydrophilic polymer. Also, the non-polymeric matrix may be an oleophilic matrix, and the at least a first polymer may be a hydrophobic polymer. In embodiments in which the non-polymeric matrix is an aqueous matrix, the at least a first polymer may, for example, be a hydrophilic polymer. The at least a first polymer may, for example, be water soluble. In a number of embodiments, the hydrophilic polymer is a polyalkylene oxide. The hydrophilic polymer may, for example, be a polyethylene glycol.

In another aspect, a method of dispersing a component in a matrix includes adding an agent to the matrix. The agent is formed by grafting at least a first polymer with lignin. The first polymer has an affinity for the matrix. Lignin has an affinity for the component. The component is other than the agent, lignin or the at least a first polymer. The method for includes contacting the matrix with the component. As described above, lignin may interact with the component. Lignin may, for example, provide interfacial adhesion with the component. A number of embodiments of the agent, the component and the matrix are described above.

As described the matrix may be a non-polymeric matrix. The non-polymeric matrix may, for example, be a solid matrix, a liquid matrix or a multiphase matrix. The non-polymeric matrix may, for example, be an aqueous matrix, and the at least a first polymer may be a hydrophilic polymer. The non-polymeric matrix may also an oleophilic or hydrophobic matrix, and the at least may be a first polymer may be a hydrophobic polymer. In a number of embodiments, the matrix is an aqueous matrix and the at least a first polymer is a hydrophilic polymer. The at least a first polymer may, for example, be water soluble. In a number of embodiments, the hydrophilic polymer is a polyalkylene oxide. The hydrophilic polymer may, for example, be a polyethylene glycol.

In a number of embodiments, the matrix and the agent form a dispersing agent for use in subterranean hydrocarbon recovery. The aqueous matrix may, for example, include a brine.

In another aspect, a composition includes a polymeric matrix and an agent within the polymeric matrix. The agent is formed by grafting at least a first polymer with lignin. The at least a first polymer has an affinity for the polymeric matrix. The composition has a toughness greater than the toughness of the polymeric matrix (that is, the polymer matrix absent the agent). The at least a first polymer may, for example, be miscible with the polymeric matrix or compatible the polymeric matrix.

In a number of embodiments, the polymeric matrix includes a thermoplastic polymer. In a number of embodiments, the polymeric matrix is an adhesive polymeric matrix or an elastomeric polymeric matrix.

In number of embodiments, the polymeric matrix includes a synthetic thermoplastic polymeric matrix. The at least a first polymer may, for example, be a first synthetic thermoplastic polymer formed from one or more monomers, and the polymeric matrix may, for example, include a second synthetic thermoplastic polymer which is formed from the one or more monomers.

In a number of embodiments, the at least a first polymer is a polystyrene and the second synthetic thermoplastic polymer is a polystyrene, the at least a first polymer is a polyacrylate and the second synthetic thermoplastic polymer is a polyacrylate polymer, the at least a first polymer is a polyester polymer and the second synthetic thermoplastic polymer is a polyester polymer, or the at least a first polymer is a polyvinyl polymer and the second synthetic thermoplastic polymer is a polyvinyl polymer. In a number of embodiments, the at least a first polymer is formed from one or more monomers including a methyl methacrylate monomer, and the second synthetic thermoplastic polymer is formed from one or more monomers including a methyl methacrylate monomer.

The agent may, for example, be formed by further grafting at least one other polymer to the lignin, wherein the at least a first polymer is formed from one or more monomers and the at least one other polymer is formed from the one or more monomers. The first polymer may alternatively be formed from one or more monomers which are different from the one or more monomers forming the at least one other polymer.

As describe above, the at least a first polymer may, for example, be formed via controlled radical polymerization. The at least a first polymer may, for example, be formed via atom transfer radical polymerization, nitroxide-mediated polymerization, reversible addition fragmentation chain transfer and catalytic chain transfer, ring-opening polymerization or ring-opening metathesis polymerization.

The at least a first polymer may, for example, be grafted from the lignin or grafted to the lignin.

In another aspect, a method of increasing toughness of a polymeric matrix includes adding an agent to the polymeric matrix. The agent is formed by grafting at least a first polymer with lignin. The first polymer has an affinity for the polymeric matrix. The at least a first polymer may, for example, be miscible with the polymeric matrix or compatible the polymeric matrix.

In a number of embodiments, the polymeric matrix includes a thermoplastic polymer. The polymeric matrix may also be an adhesive polymeric matrix or an elastomeric polymeric matrix.

In a number of embodiments, the polymeric matrix includes a synthetic thermoplastic polymer. The at least a first polymer may, for example, be a first synthetic thermoplastic polymer formed from one or more monomers, and the polymeric matrix may, for example, include a second synthetic thermoplastic polymer which is formed from the one or more monomers.

In a number of embodiments, the at least a first polymer is a polystyrene and the second synthetic thermoplastic polymer is a polystyrene, the at least a first polymer is a polyacrylate polymer and the second synthetic thermoplastic polymer is a polyacrylate polymer, the at least a first polymer is a thermoplastic polyester polymer and the second synthetic thermoplastic polymer is a thermoplastic polyester, or the at least a first polymer is a polyvinyl polymer and the second synthetic thermoplastic polymer is a polyvinyl polymer. In a number of embodiments, the at least a first polymer is formed from one or more monomers including a methyl methacrylate monomer, and the second synthetic thermoplastic polymer is formed from one or more monomers including a methyl methacrylate monomer.

In a number of embodiments, the agent is formed by further grafting at least one other synthetic thermoplastic polymers to the lignin, wherein the at least a first polymer is formed from one or more monomers and the at least one other synthetic thermoplastic polymer is formed from the one or more monomers.

As described above, the at least a first polymer may, for example, be formed via controlled radical polymerization such as ATRP, NMP, RAFT, CCT, ROP or ROMP. The at least a first polymer may, for example, grafted from the lignin or grafted to the lignin.

In another aspect, a method of increasing adhesiveness of a polymeric matrix includes adding an agent to the polymeric matrix. The agent is formed by grafting at least a first polymer with lignin. The at least a first polymer has an affinity for the polymeric matrix.

In another aspect, a method of forming a composition includes deprotonating lignin to form at least one phenoxide group and reacting the at least one phenoxide group with a first functional group on a first polymer. The first functional group on the first polymer may, for example, include or be an electrophilic group. In a number of embodiments, the first functional group on the first polymer includes an aldehyde or a halide. The first functional group on the first polymer may, for example, include bromine.

In another aspect, a method of forming a composition includes grafting at least a first thermoplastic polymer onto lignin or from lignin. The at least a first thermoplastic polymer may, for example, be formed via a controlled radical polymerization. In a number of embodiments, the at least a first thermoplastic polymer is a synthetic thermoplastic polymer. A plurality of thermoplastic polymers may, for example, be grafted from or grafted onto lignin.

In another aspect, a composition is formed by grafting at least a first thermoplastic polymer onto lignin or from lignin. The at least a first thermoplastic polymer may, for example, be a synthetic thermoplastic polymer. The at least a first thermoplastic polymer may, for example, be formed via a controlled radical polymerization. A plurality of thermoplastic or synthetic thermoplastic polymers may, for example, be grafted from or grafted onto lignin.

In another aspect, a method of providing an antioxidant in a matrix includes adding to the matrix an agent formed by grafting at least a first polymer with lignin. The matrix may, for example, be a non-polymeric matrix.

In another aspect, a composition includes a non-polymeric matrix and an agent formed by grafting at least a first polymer with lignin.

In another aspect, an adhesive composition includes a polymeric portion which consists essentially of a plurality of polymer-grafted lignin agents formed by grafting at least a first polymer with lignin, wherein the at least a first polymer has adhesive properties. As used herein, the term "polymeric portion" refers to that portion of a composition that includes polymers.

In a further aspect, a method of forming an article includes molding the article from a material comprising a polymeric portion consisting essentially of a plurality of polymer-grafted lignin agents formed by grafting at least a first polymer with lignin, wherein the at least a first polymer is a thermoplastic polymer.

In still a further aspect, a composition includes an agent formed by grafting at least one polyalkylene oxide polymer with lignin. The polyalkylene oxide polymer may, for example, be a polyethylene glycol.

The present systems, methods and compositions, along with the attributes and attendant advantages thereof, will best be appreciated and understood in view of the following detailed description taken in conjunction with the accompanying drawings.

BRIEF DESCRIPTION OF THE DRAWINGS

FIG. 7A illustrates a representative embodiment of grafting a free-radical initiator based on azobisisobutyronitrile (AIBN) onto the lignin particle surface and performing reversible addition-fragmentation chain transfer (RAFT).

FIG. 7B illustrates a representative embodiment of grafting a dithioester onto the lignin particle surface and performing a grafting from polymerization.

DETAILED DESCRIPTION

Figure 1:
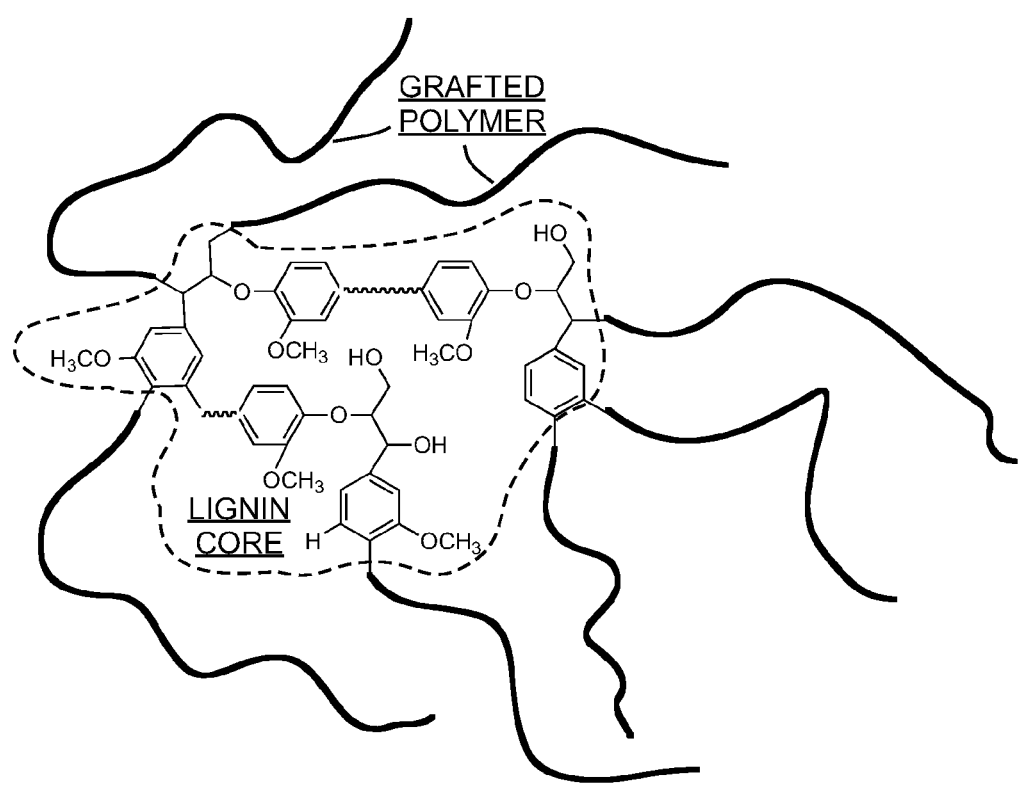
FIG. 1 illustrates schematically a polymer-grafted lignin material hereof showing a portion of the lignin residue or core and a plurality of polymers attached to the lignin core.

It will be readily understood that the features, structures, or characteristics of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As used herein and in the appended claims, the singular forms "a," "an", and "the" include plural references unless the context clearly dictates otherwise. Thus, for example, reference to "a polymer" or includes a plurality of such polymers and equivalents thereof known to those skilled in the art, and so forth, and reference to "the polymer" is a reference to one or more such polymers and equivalents thereof known to those skilled in the art, and so forth. Recitation of ranges of values herein are merely intended to serve as a shorthand method of referring individually to each separate value falling within the range. Unless otherwise indicated herein, and each separate value as well as intermediate ranges are incorporated into the specification as if it were individually recited herein. All methods described herein can be performed in any suitable order unless otherwise indicated herein or otherwise clearly contraindicated by the text.

As user herein, the term "polymer" refers to a chemical compound that is made of a plurality of small molecules or monomer that are arranged in a repeating structure to form a larger molecule. Polymers may occur naturally or be formed synthetically. The use of the term "polymer" encompasses homopolymers as well as copolymers. The term "copolymer" is used herein to include any polymer having two or more different monomers. Copolymers may, for example, include alternating copolymers, periodic copolymers, statistical copolymers, random copolymers, block copolymers, graft copolymers etc. Examples of polymers include, for example, poly(methyl methacrylate) and polystyrene, which are synthetic thermoplastics. As used herein, the term "thermoplastic" refers to a polymer that becomes pliable or moldable above a specific temperature, and returns to a solid state upon cooling, and is able to repeat those processes. As used herein, the term "adhesive" refers to a material that, when applied to a surface, interacts with the surface to resist separation. As use herein, the term "elastomer" refers to a polymer that exhibits elastic deformation. In that regard, (under a range of conditions) the polymer returns (either completely or partially) to its original shape upon deformation.

Composite materials have many applications. A composite material may, for example, be described as a mixture or mechanical combination of two or more components, materials or substances. A composite may, for example, be a multicomponent material including multiple different (non-gaseous) phase domains in which at least one type of phase domain is a continuous phase. A nanocomposite is a composite in which at least one of the phases or domains of the composite has at least one dimension of the order of nanometers. Polymer composites and nanocomposites, for example, may have superior mechanical properties compared to polymers/plastics based on linear polymer chains, which is important for developing high-performance materials. These materials may be used as bulk commodity materials and have a broad range of application. For example, such materials may be used as elastic modifiers in plastics, or as fillers and binders in carbon composites, such as carbon-fiber composites or battery electrodes based on graphite or activated carbons. Specific applications for high-strength carbon composites, for example, include but are not limited to lightweight body armor and structural components of vehicles, materials for aerospace, and sporting equipment. Developing composites and nanocomposites based on inexpensive, abundant feedstocks using facile synthetic methods that are consistent with green chemistry principles is a challenge in material science and engineering.

Lignin is a complex, cross-linked racemic macromolecule or biopolymer that is a key structural component of woody plants. Three monolignol monomers of lignin (which are methoxylated to various degrees), p-coumaryl alcohol, coniferyl alcohol, and sinapyl alcohol, are incorporated into lignin in the form of the phenylpropanoids p-hydroxyphenyl (H), guaiacyl (G), and syringyl (S), respectively. Different types of lignin are described depending on the means of isolation. Lignin may, for example, be obtained from kraft pulping, sulfite pulping, soda process, organic solvent processes, steam explosion processes, and dilute acid (for example, sulfuric acid) processes. In general, any type of lignin can be used in the compositions hereof, including, for example, kraft lignin, solvolysis lignin, organosolv lignin, steam exploded lignin, wood waste, natural wood, corn stalk, biopitch, molasses, wood meal and coffee grounds.

Lignin has an affinity for (that is, interacts such that close proximity is favored or likely) many materials such as carbon-based materials or compounds and other materials. In that regard, lignin may interact with a material, compound or component via, for example, hydrogen bonding and/or aromatic groups. For example, aromatic groups on components such as dyes and petroleum components readily interact with lignin. Also, organic materials and/or inorganic materials (for example, metal oxides) with groups that participate in hydrogen bonding (for example, hydroxyl groups) may also interact. In general, lignin interacts relatively strongly with such materials. The present inventors have discovered that such affinities/interactions are maintained when lignin is present as a lignin core in the polymer-grafted lignin hereof. On the basis of composition, one skilled in the art can predict materials, compounds or components with which the lignin core of the polymer-grafted lignin agents hereof will interact. To the extent any question still remained after this exercise, routine laboratory experiment may be used to determine such interaction.

In a number of embodiments, polymer-grafted lignin agents are used to facilitate the incorporation of various substances, materials compounds or (collectively) components into a composite material. In that regard, the lignin core of the polymer-grafted lignin exhibits an affinity for the one or more components to be incorporated into the composite material. For example, the lignin may interact with the component (for example, via providing interfacial adhesion therewith).

In a number of embodiments, polymer-grafted lignin agents are used in incorporating a component into a matrix or medium. As used herein, the term matrix refers to a material or plurality of materials (other than the polymer-grafted agent) into which the polymer-grafted lignin agents hereof may distributed. Matrices hereof may include a single or multiple materials, which may, for example, be solids, (including single-component solids, multi-component solids, single-phase solids, multiphase solids, particulates, powders etc.), liquids (including single-component liquids, multi-component liquids, single-phase liquids, multiphase liquids etc.), suspensions, colloids, gels, slurries, pastes, polymers, etc. The polymer(s) grafted on the lignin core improve the dispersion of lignin within the matrix (in which, lignin may, for example, otherwise be insoluble, immiscible or incompatible). The polymer grafted to the lignin may, for example, exhibit an affinity for the matrix or a distributed component thereof to assist in dispersing the polymer-grafted lignin agent (and thereby the component) within the matrix. In that regard, the polymer grafted to lignin may exhibit an affinity for the matrix greater than the affinity of lignin for the matrix to facilitate distribution or dispersion of the lignin core of the polymer-grated lignin within the matrix. For example, the polymer may interact with the matrix (for example, via providing interfacial adhesion with an entity of a bulk phase thereof).

In all embodiments hereof, the number of polymer grafts on a lignin core, as well as the molecular weight, polydispersity, and the type/nature of polymer(s) grafted to a lignin core can be adjusted/controlled to achieve a desired result which may, for example, dictated by the intended use. In a number of embodiments, each of the polymers grafted to lignin core is of the same type (that is, formed from the same monomer or monomers). Moreover, the molecular weight and polydispersity of the grafted polymer can be well controlled (for example, via controlled radical polymerization). Polydispersity can, for example, be maintained less than 2, less than 1.5 or less than 1.2. In a number of embodiments, different types of polymers, as well as polymer of differing molecular weight or broad polydispersity, may be grafted to the same lignin core.

In a number of embodiments, the matrix may, for example, be a polymeric matrix including one or more polymers. In general, as used herein, a polymeric matrix is a matrix having a polymeric continuous or bulk phase. As used herein a polymeric continuous phase is a continuous phase in which the polymeric material(s) thereof have a number average molecular weight of at least 5000. More typically, the number average molecular weight will be at least 15,000. The polymer grafted with the lignin may, for example, be miscible with or compatible with the polymeric matrix (that is, with one or more polymers within the polymeric matrix). Miscibility is the capability of a mixture of polymers to form a single phase over certain ranges of temperature, pressure and composition. Compatibility refers to the ability of an immiscible polymer blend or a polymer composite to exhibit interfacial adhesion. Polymer interaction (for example, miscibility and/or compatibility) may, for example, be readily predicted using known theory (for example, Flory-Huggins theory, lattice fluid theory etc.). The polymeric matrix may, for example, be a thermoplastic polymeric matrix, an adhesive polymeric matrix or an elastomeric polymeric matrix. In a number of embodiments, compositions hereof are structural thermoplastic composites.

Polymer-grafted lignin agents hereof may be used to disperse an additive in a polymeric matrix. As used herein, the term "additive" when used in reference to a polymer or polymeric matrix, is simply a substance added to the polymer or polymeric matrix. The additive, may for example, be an antioxidant, an extender, a filler, a flame retardant, an impact modifier, or a reinforcement. Extenders are substances used to, for example, lower the cost of the material. Extenders literally increase the overall volume of the polymer. A filler is a solid extender. Impact or toughness modifiers, enable polymers to better absorb shocks and resist impact without cracking. Reinforcements are used to reinforce or improve, for example, tensile strength, flexural strength and/or stiffness of the material. Reinforcements are often fiber-based materials (for example, carbon fibers).

A material matrix which does not have a polymeric continuous phase is described herein as a non-polymeric matrix. A non-polymeric matrix may include polymeric material(s), but lacks a polymeric continuous phase. The polymer-grafted lignin agents hereof also provide for efficient dispersion of a component or components in a non-polymeric matrix. A non-polymeric matrix may, for example, be water, an aqueous medium, or semi-aqueous medium (referred to herein collectively as aqueous matrices or media), or be an organic, non-aqueous matrix (for example, including an oil, a wax or other hydrophobic material). As described above, non-polymeric matrices may, for example, be a solid phase matrix, a liquid phase matrix, or multi-phase matrix such as a suspensions, a colloid, a gel, a slurry, or a paste.

In a number of embodiments, the matrix and agent forms a dispersing system. Such a dispersing system or dispersing agent may, for example, be used in subterranean hydrocarbon (that is, oil, gas etc.) recovery. The polymer-grafted lignin agents hereof may, for example, be used to break up flocculants or aggregates (the components of which, the lignin core of the polymer-grafted lignin may have affinity—for example, basaltic materials) and/or to decrease viscosity. Typically, the matrix for such dispersing agent is aqueous and may, for example, include a brine (that is, water of relatively high salinity or salt content) which may be readily available at hydrocarbon recovery sights.

In a number of embodiments hereof, polymer-grafted lignin agents are used to alter incorporate a component in a composite product to alter material characteristics such as mechanical performance, adhesion, dispersion, antioxidant characteristics etc. in a broad range of materials and technologies.

A matrix hereof (for example, an aqueous matrix) may also be added to an environment to remove a component (for example, a contaminant for which the lignin core of the polymer-grafted lignin has an affinity) from the environment.

The lignin core (a nontoxic, biocompatible and biodegradable biopolymer) may, for example, be readily grafted with other nontoxic, biocompatible polymers, and the resulting polymer-grafted lignin agents may be incorporated within many substances or products including polymeric and non-polymeric substances for topical use/application (for example, in medicinal and/or cosmetic matrices or substances). As used herein, the term "biocompatible" refers generally to compatibility with living tissue or a living system. The term "biodegradable" refers generally to the ability to be broken down into smaller components via natural processes. Biodegradable polymers (for example, polyesters such a polycaprolactone and poly(l-lactic acid)) may, for example, be grafted with a lignin core to preserve or enhance biodegradability.

In a number of embodiments, the polymer-grafted lignin agents hereof may be used without any additional component for which the lignin core has an affinity to, for example, impart or enhance one or more characteristics such as antioxidant characteristics, adhesiveness, or toughness to materials in which the polymer-grafted lignin are mixed/dispersed. In that regard, polymer-grafted lignin agents hereof may, for example, be used in connection with polymeric and non-polymeric matrices or media to provide or enhance characteristics which are inherent to the lignin core.

As described above, lignin is inherently adhesive and will adhere strongly to a number of surfaces (including, for example, wood and other surfaces). Polymer-grafted lignin agents hereof may, for example, be used as an adhesive for bonding to wood. Adhesive composition of polymer-grafted lignin agents hereof for adhesive applications may, for example, include poly(vinyl acetate)-grafted lignin core. Additionally, polymer-grafted lignin agents hereof may, for example, be used as an additive/filler to toughen various resins such as epoxy resins and to improve adhesion. Reversible adhesives may, for example, be prepared by grafting lignin with 2-methoxyethyl acrylate (MEA), which has been used in pressure-sensitive adhesives. In adhesive bonding (that is, permanent adhesion), lignin grafted with a variety of polymers, such as polystyrene, may be included in an epoxy resin. In both pressure-sensitive (reversible) adhesive applications and in bonding (permanent) applications, the polymer-grafted lignin component can improve toughness of the adhesive material as well as enhance interfacial bonding as a result of to the lignin core's inherent attraction for/interaction with a broad range of materials.

Composite, polymer-grafted lignin agents and materials hereof may, for example, be used as tough materials in pure form, or can be blended with polymers or polymeric matrices to increase the toughness thereof. Incorporation of polymer-grafted lignin in polymers (such as synthetic polymers) consistently results in polymer composite or nanocomposite materials that are significantly tougher than the individual constituents thereof. In a number of embodiments, polymer-grafted lignin is incorporated within a thermoplastic, (including, for example, polystyrenes, polyacrylates, polyvinyls and polyesters) as a toughening agent or additive. In that regard, poly(methyl methacrylate) or PMMA is a representative example of a glassy polymer that requires reinforcement to function, for example, as a glass substitute, a decorative material, and as a structural material. Polymer-grafted lignin may also be incorporated in adhesives (as described above) or in elastomers to, for example, provide enhanced toughness. For example, a polymer-grafted lignin, wherein the grafted polymer was formed from n-butyl acrylate, provided an elastic material.

Additionally, polymer-grafted agents or materials hereof may also be used (either alone or in combination with a polymer or polymeric matrix) as a polymer binder for various materials for which the lignin core has affinity (including, for example, carbon and carbon-based materials). In general, the lignin core can bond effectively to the such materials, providing excellent interfacial adhesion between the binder and the material. Polymer-grafted lignin has a number of attributes demonstrated herein that make it an excellent binder and resin for composite materials such as carbon fiber composites. For example: (1) the physico-chemical characteristics of lignin (the lignin core) provide interfacial adhesion of the grafted material to carbon fiber (and other) surfaces, (2) polymer-grafted lignin is significantly tougher than, for example, the corresponding polymer or corresponding lignin-polymer blends (3) and the grafted polymer will entangle with the binder matrix.

A number of chemical methods that are suitable for preparing polymer-grafted lignin agents or materials hereof. A schematic representation of a polymer-grafted lignin is set forth in FIG. 1 in which a plurality of linear polymers are attached to a lignin core. Polymers grafted to lignin may, for example, vary in structure: including, for example, linear polymers, branched polymers etc. The resulting compositions yield composite or nanocomposite materials that are, for example, significantly tougher than their individual constituents. Methods for creating polymer-grafted lignin materials include grafting-from approaches and grafting-onto approaches. As discussed above, the resultant composite materials may, for example, be used as extremely tough materials in pure form, or can be blended with other material (for example, polymers and non-polymers) as a toughening additive, an adhesive, a dispersant etc. As also described above, lignin-polymer materials hereof can also be used as a polymer binder for materials such as carbon-based materials in which the lignin bonds effectively to the material surface, providing excellent interfacial adhesion between the binder and the material phase.

Figure 2:
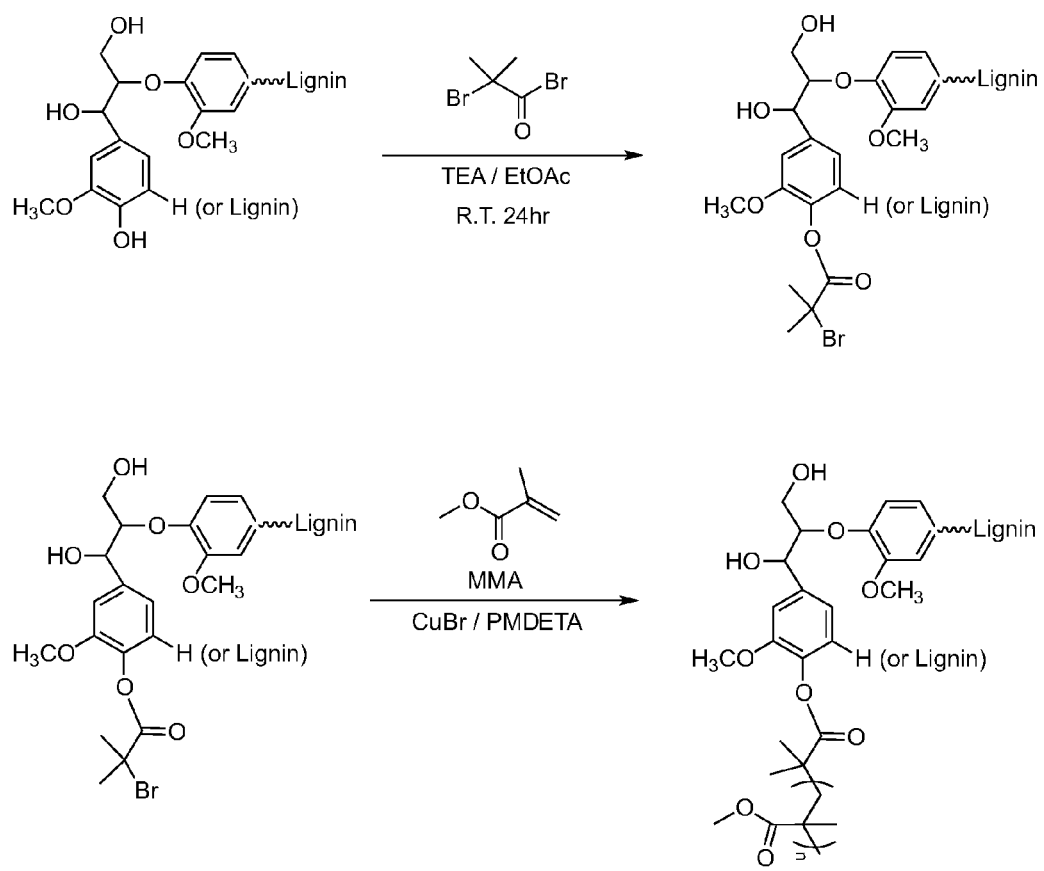
FIG. 2 illustrates a representative embodiment of a reaction scheme for preparing a graft based on poly(methyl methacrylate) (PMMA).

In one example of a grafting from approach, synthetic polymers were grafted from kraft lignin to form composites. In a number of embodiments, the lignin core has an average diameter of 5 nm and grafting density may, for example, be varied between approximately 1-100 grafts/lignin particle. However, the graft density will depend in part the size of the lignin particle and the number of sites for grafting, which may be varied using established chemical modification strategies. The grafted materials may, for example, be prepared using a controlled radical polymerization such as atom transfer radical polymerization (ATRP). A sample reaction scheme for preparing a graft based on poly(methyl methacrylate) (PMMA) is shown in FIG. 2.

CRP enable the control of polymer compositions, architectures, and functionalities for the development of materials with a specific set of properties. ATRP, nitroxide mediated polymerization (NMP), reversible addition fragmentation chain transfer (RAFT) and catalytic chain transfer (CCT), ring-opening polymerization (ROP) and ring-opening metathesis polymerization (ROMP) are representative examples of controlled/living radical polymerization processes or CRP that provide versatile methods for the synthesis of polymers from a broad spectrum of vinyl-monomers with controlled molecular weight, low polydispersity and site specific functionality. CRP processes provide compositionally homogeneous, well-defined polymers (with predictable molecular weight, narrow molecular weight distribution, and, potentially, high degree of chain end-functionalization). CRP have been the subject of much study as reported in several review articles. See, for example, Matyjaszewski, K., Ed. Controlled Radical Polymerization; ACS: Washington, D.C., 1998; ACS Symposium Series 685. Matyjaszewski, K., Ed. Controlled/Living Radical Polymerization. Progress in ATRP, NMP, and RAFT; ACS: Washington, D.C., 2000; ACS Symposium Series 768. Matyjaszewski, K., Davis, T. P., Eds. Handbook of Radical Polymerization; Wiley: Hoboken, 2002. Qiu, J.; Charleux, B.; Matyjaszewski, K. Prog. Polym. Sci. 2001, 26, 2083. Davis, K. A.; Matyjaszewski, K. Adv. Polym. Sci. 2002, 159, 1.

ATRP is presently one of the most robust CRP and a large number of monomers can be polymerized providing compositionally homogeneous well-defined polymers having predictable molecular weights, narrow polydispersity, and high degree of end-functionalization. Matyjaszewski and coworkers disclosed ATRP, and a number of improvements in the basic ATRP process, in a number of patents and patent applications. See, for example, U.S. Pat. Nos. 5,763,546; 5,807,937; 5,789,487; 5,945,491; 6,111,022; 6,121,371; 6,124,411; 6,162,882; 6,624,262; 6,407,187; 6,512,060; 6,627,314; 6,790,919; 7,019,082; 7,049,373; 7,064,166; 7,157,530 and U.S. patent application Ser. No. 09/534,827; PCT/US04/09905; PCT/US05/007264; PCT/US05/007265; PCT/US06/33152 and PCT/US2006/048656, the disclosures of which are herein incorporated by reference.

Figure 3A:
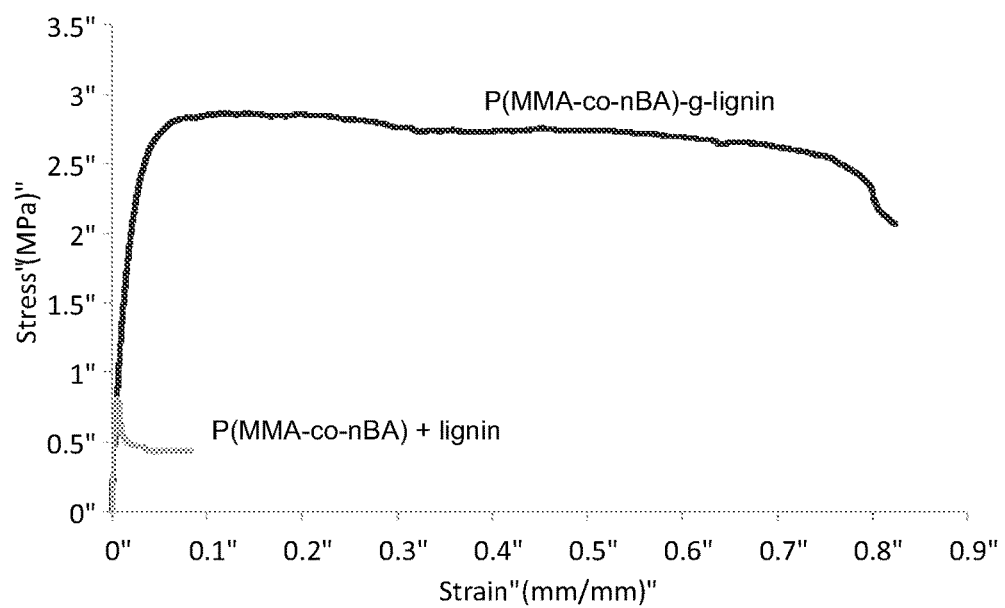
FIG. 3A illustrates a comparison of tensile strength of lignin grafted with a copolymer of methy methacrylate (MMA) and n-butyl acrylate compared to a physical blend of lignin and the copolymer.

A representative material was prepared by grafting methyl methacrylate (MMA) and n-butyl acrylate (nBA) from lignin using ATRP. In a number of studies, the graft density was 16 polymers/lignin particle and the average molecular weight of each grafted polymer was approximately 18,000 g/mol, resulting in a material that is 4.4% lignin and 95.6% P(MMA-co-nBA). This material was significantly tougher than a physical blend of lignin and P(MMA-co-nBA), as shown in the tensile testing in FIG. 3A.

Figure 3B:
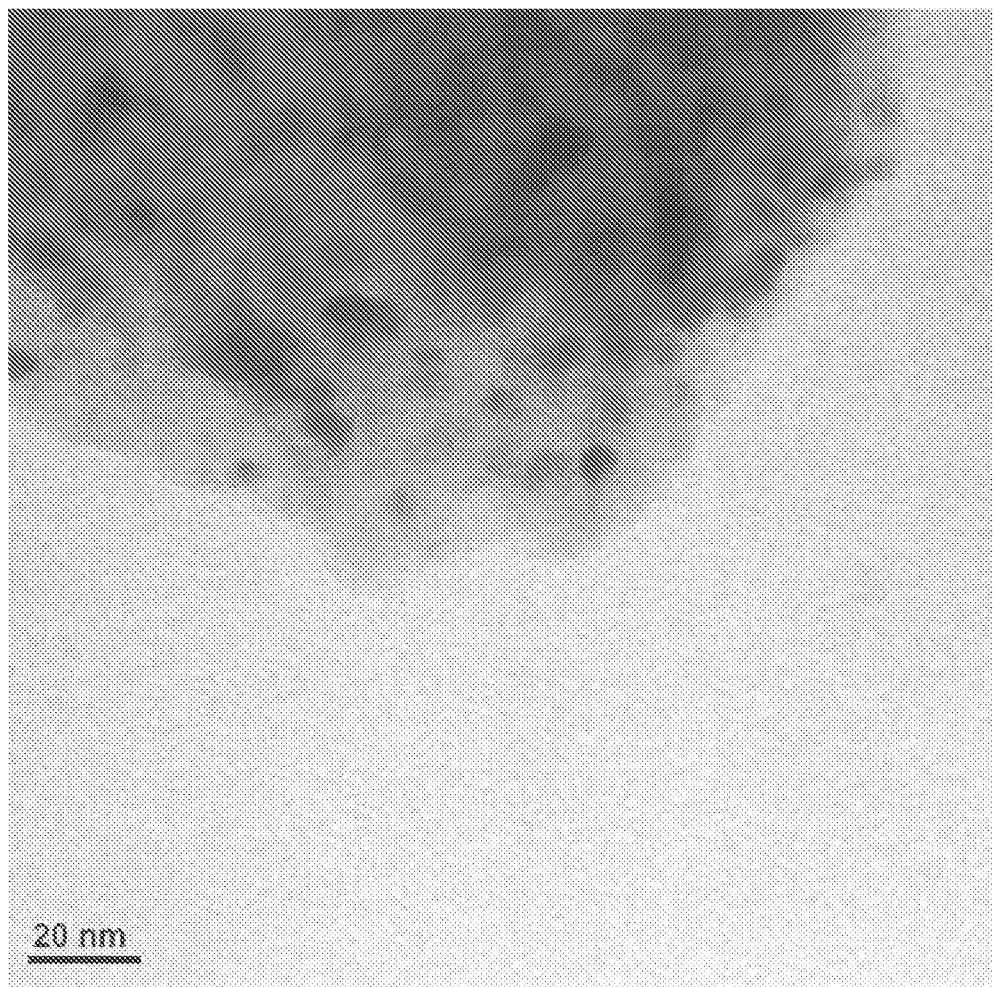
FIG. 3B illustrates a transmission electron microscopy photomicrograph of the lignin-P(MMA-co-nBA) composite material of FIG. 3A.

The structure of the lignin-P(MMA-co-nBA) composite material was characterized using transmission electron microscopy (TEM) by first staining the sample with OsO4, which preferentially increased the electron density of the lignin component. Discreet lignin domains having mean diameter of approximately 5 nm were observed as illustrated in FIG. 3B, indicating that the microstructure is based on a lignin core surrounded by a corona of polymer chains.

Figure 4:
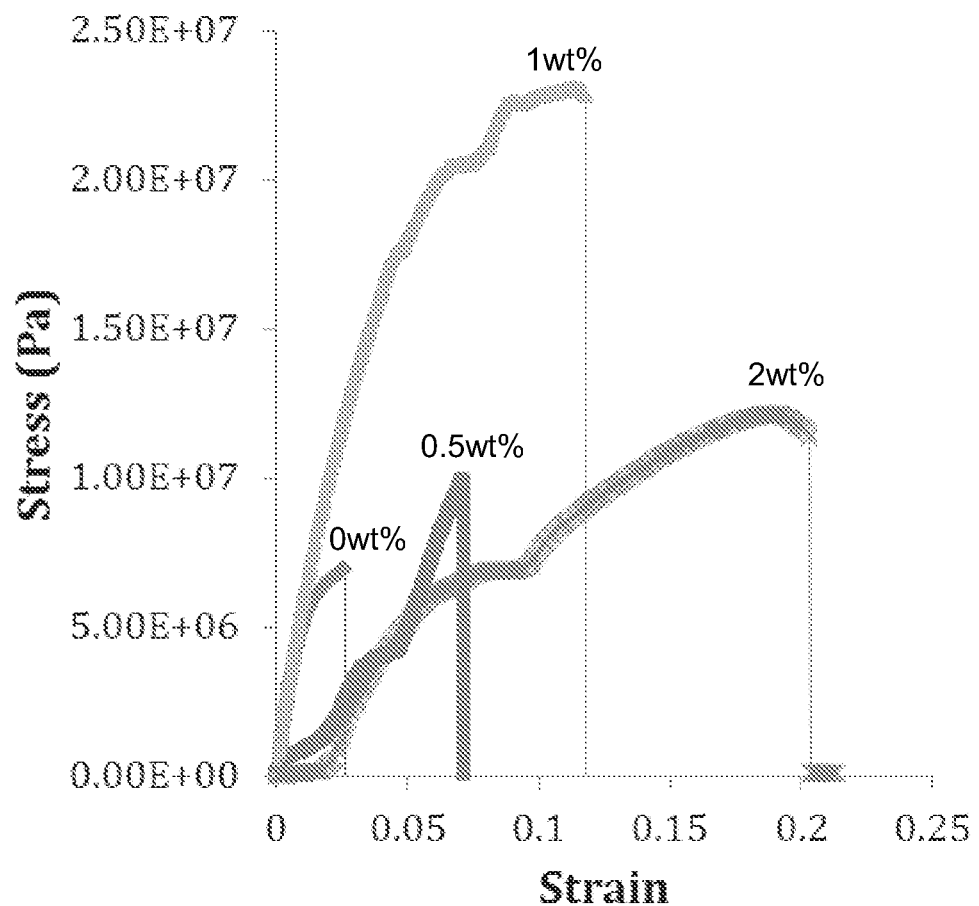
FIG. 4 illustrates stress-strain data from tensile testing of PMMA including various weight percent of PMMA-grafted lignin and PMMA with no PMMA-grafted lignin.

In a further example, lignin can be grafted with poly (methyl methacrylate) (PMMA) to create a nanoscale agent/ filler that was used to reinforce PMMA materials. Incorporating the PMMA-grafted lignin improved toughness. Lignin samples were prepared having 7 PMMA chains grafted from each lignin particle on average, with each graft having an approximate degree of polymerization of 400. The polymers were prepared using ATRP. PMMA was polymerized from the MMA monomer using azobisisobutyrylnitrile initiator, resulting in a polymer with average molecular weight of 166,000 g/mol. In these experiments, the PMMA-grafted lignin agent was blended into PMMA homopolymer at mass fractions of 0%, 0.5%, 1%, and 2% using pyridine to perform solvent blending. Following vacuum annealing at 120° C., samples were prepared for tensile testing, and representative stress-strain curves for each composition are shown in FIG. 4. PMMA is a glassy polymer, and brittle fracture at a strain of 2% is expected for PMMA. Incorporation of the PMMA-grafted lignin resulted in a monotonic increase as a function of the filler concentration in both strain at failure as well as toughness. These results further indicate that lignin grafted with thermoplastic polymer can be used as a toughening agent in polymeric materials.

Figure 5A:
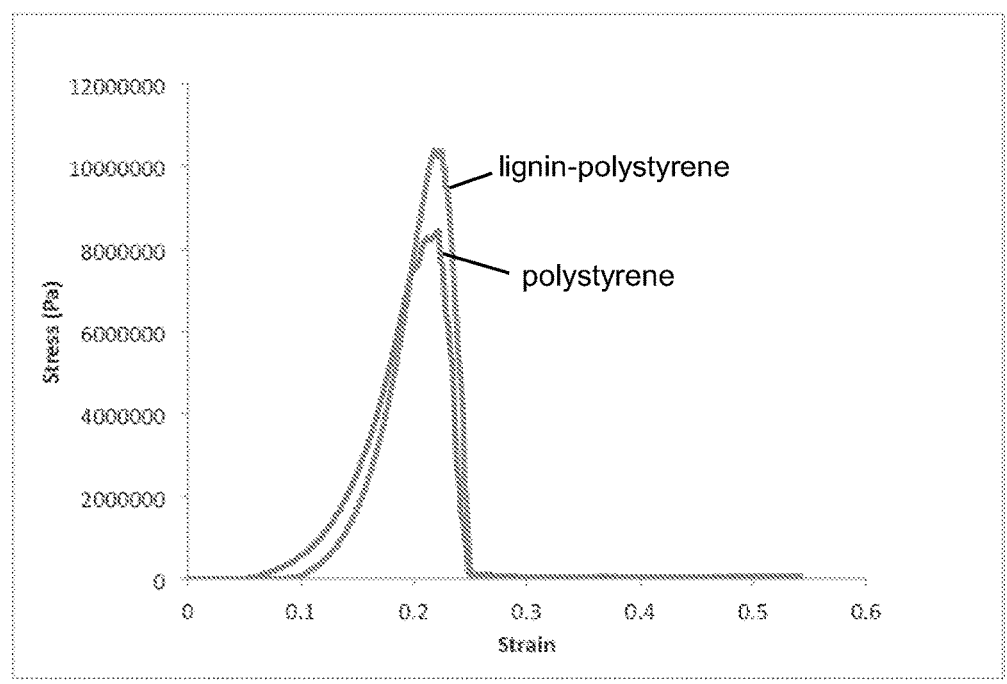
FIG. 5A illustrates the results of stress-strain studies under compression of a polystyrene/carbon composite and a polystyrene-grafted lignin/carbon composite.

In another representative example, a lignin-styrene composite material was synthesized and used as a binder for carbon composites. A carbon electrode based on particulate activated carbon (mean particle size=35 µm) was fabricated using 10% binder. One binder was pure polystyrene (molecular weight=25,000 g/mol) and the other binder was polystyrene grafted onto lignin (7 grafts/lignin particle; graft molecular weight=25,000 g/mol). The mechanical properties were tested under compression and the data are summarized forth in FIG. 5A. The results indicated that the yield point for the lignin-polystyrene graft was higher (21% strain, 10.1 MPa stress) than that of pure polystyrene binder (19% strain, 7.2 MPa stress).

Figure 5B:
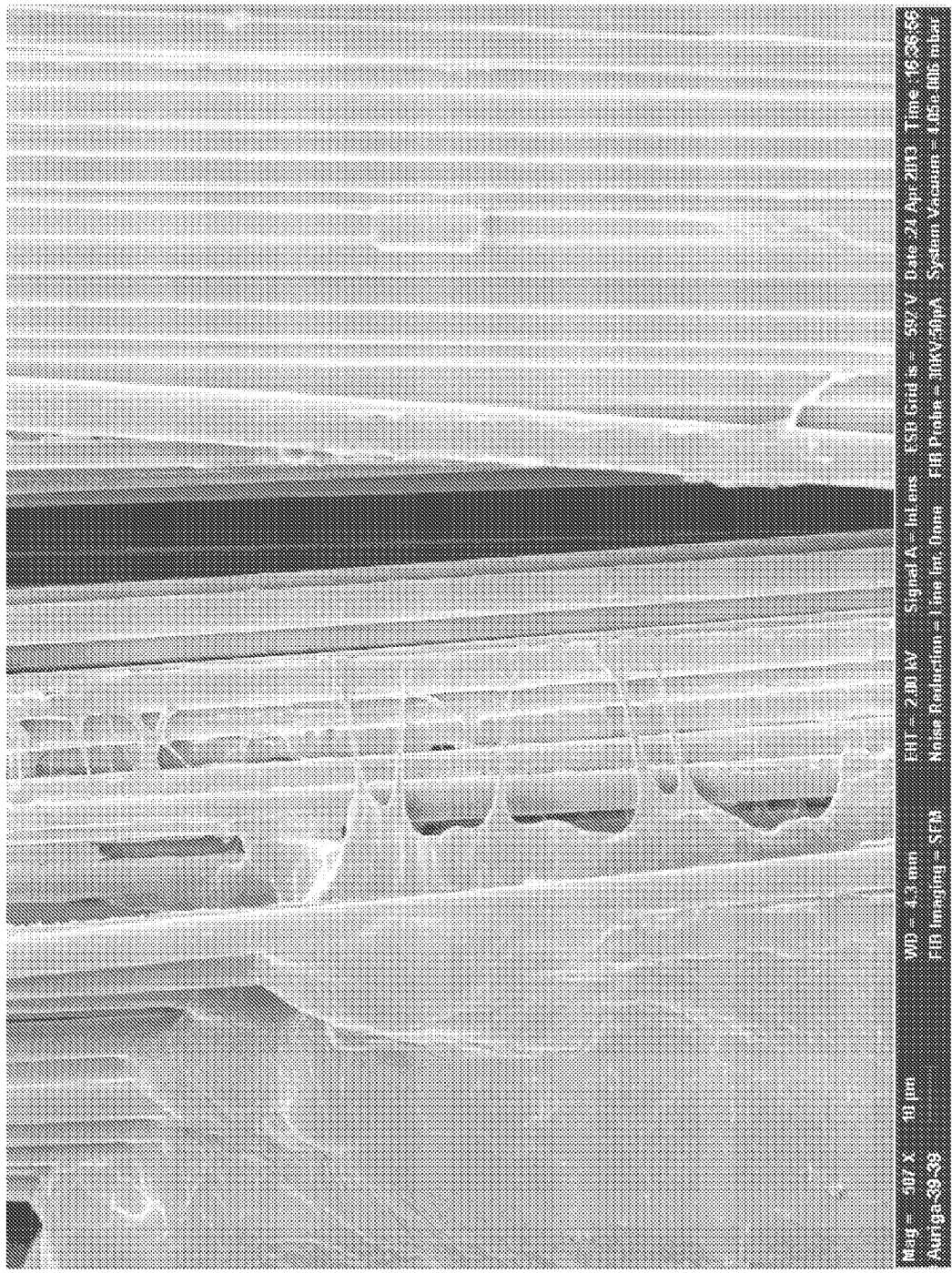
FIG. 5B illustrates a photomicrograph showing adhesion of polystyrene-grafted lignin to carbon fibers.
Figure 5C:
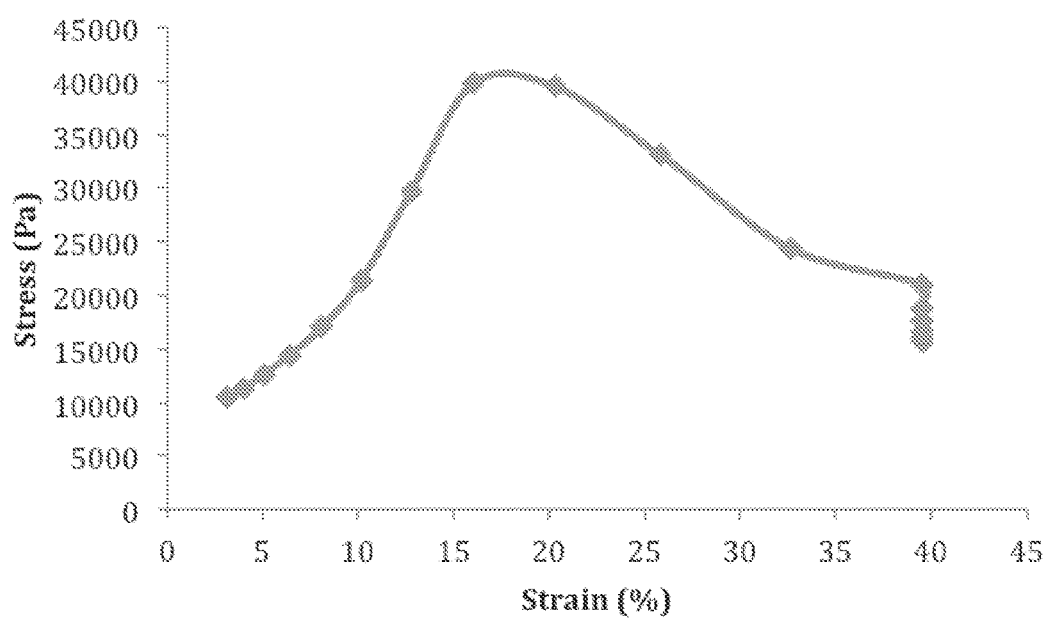
FIG. 5C illustrates a stress strain curve for a composite including a polystyrene-grafted lignin binder and carbon fibers.

In another set of studies, kraft lignin grafted with approximately 16 polystyrene chains per particle was used as a binder in carbon fiber composites. Each polystyrene chain had average degree of polymerization of 350, resulting in a lignin mass fraction of approximately 4%. The polystyrene-grafted lignin was dissolved in pyridine and embedded in HEXTOW® AS4-12k carbon fibers available from Hexcel Corporation of Stamford, Conn. Electron microscopy of 1% solutions deposited onto the carbon fibers showed excellent adhesion between the binder and fibers, as shown in FIG. 5B. Without limitation to any mechanism, this result may be attributed to the effect of the lignin core, which could adhere strongly to the fiber surface. The mechanical properties of the carbon fiber composite with polystyrene-grafted lignin binder were evaluated using a three-point bend test. The resulting stress-strain curve is shown in FIG. 5C. The toughness (which may be calculated as the area under the stress strain curve) was calculated to be 542 kJ/m$^2$, which is greater than many commercial carbon fiber composites. The yield point at a strain of approximately 15% suggests that lignin-based binder was adhering strongly to the carbon fibers.

The lignin core's affinity for and interaction with carbon is also representative of the manner in which the lignin core can interact with various components to assist in dispersing such components within a matrix.

Figure 6:
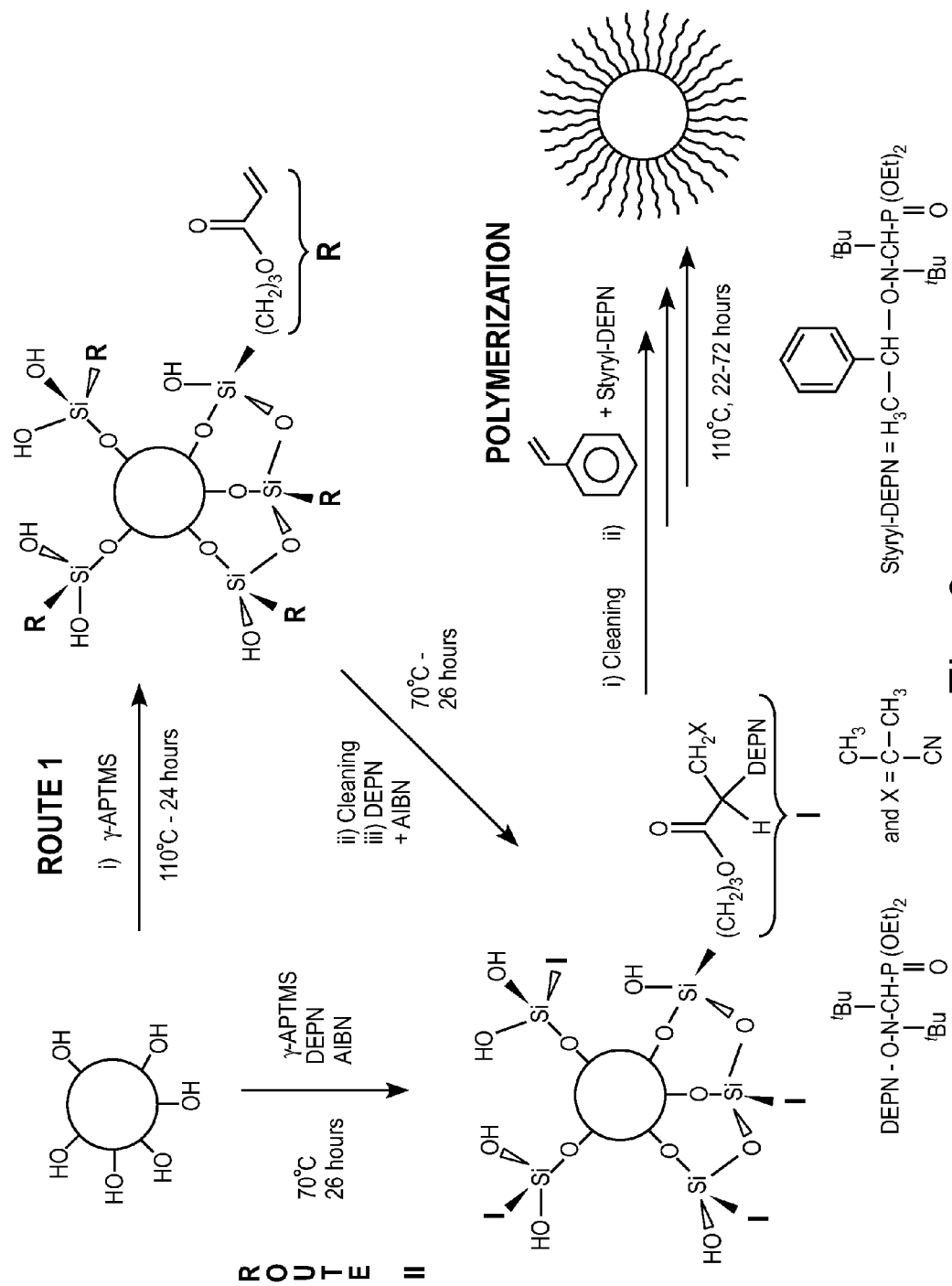
FIG. 6 illustrates a representative embodiment of a grafting from approach, using the controlled radical polymerization technique of atom transfer radical polymerization.

As described above, grafting-from lignin methods may also include nitroxide-mediated polymerization (NMP) and reversible addition-fragmentation chain transfer (RAFT) as alternative methods to grafting polymers from lignin using ATRP. Both methods have been adapted to be used to graft polymers from material surfaces. Lignin may, for example, be considered as a nanoparticle with a given density of reactive hydroxyl or carboxylic acid groups. Lignin also contains hydroxyl groups and this approach, wherein lignin is modeled as a particle, is shown in FIG. 6. See Bartholome C, Beyou E, Bourgeat-Lami E, Chaumont P, Lefebvre F, Zydowicz N., Nitroxide-mediated polymerization of styrene initiated from the surface of silica nanoparticles. In situ generation and grafting of alkoxyamine initiators, *Macromolecules*, 38:1099-106. (2005).

RAFT polymerization has similarities to ATRP with a chain-transfer agent (CTA) controlling the instantaneous concentration of propagating radicals. Dithioesters are common choices for CTA. In a representative example, one may graft a free-radical initiator, such as a free-radical initiator based on azobisisobutyronitrile (AIBN), onto the lignin particle surface and perform RAFT polymerization as shown in FIG. 7A. Another option, shown in FIG. 7B, is to graft the dithioester via the R group to the particle surface and graft from this.

Figure 8:
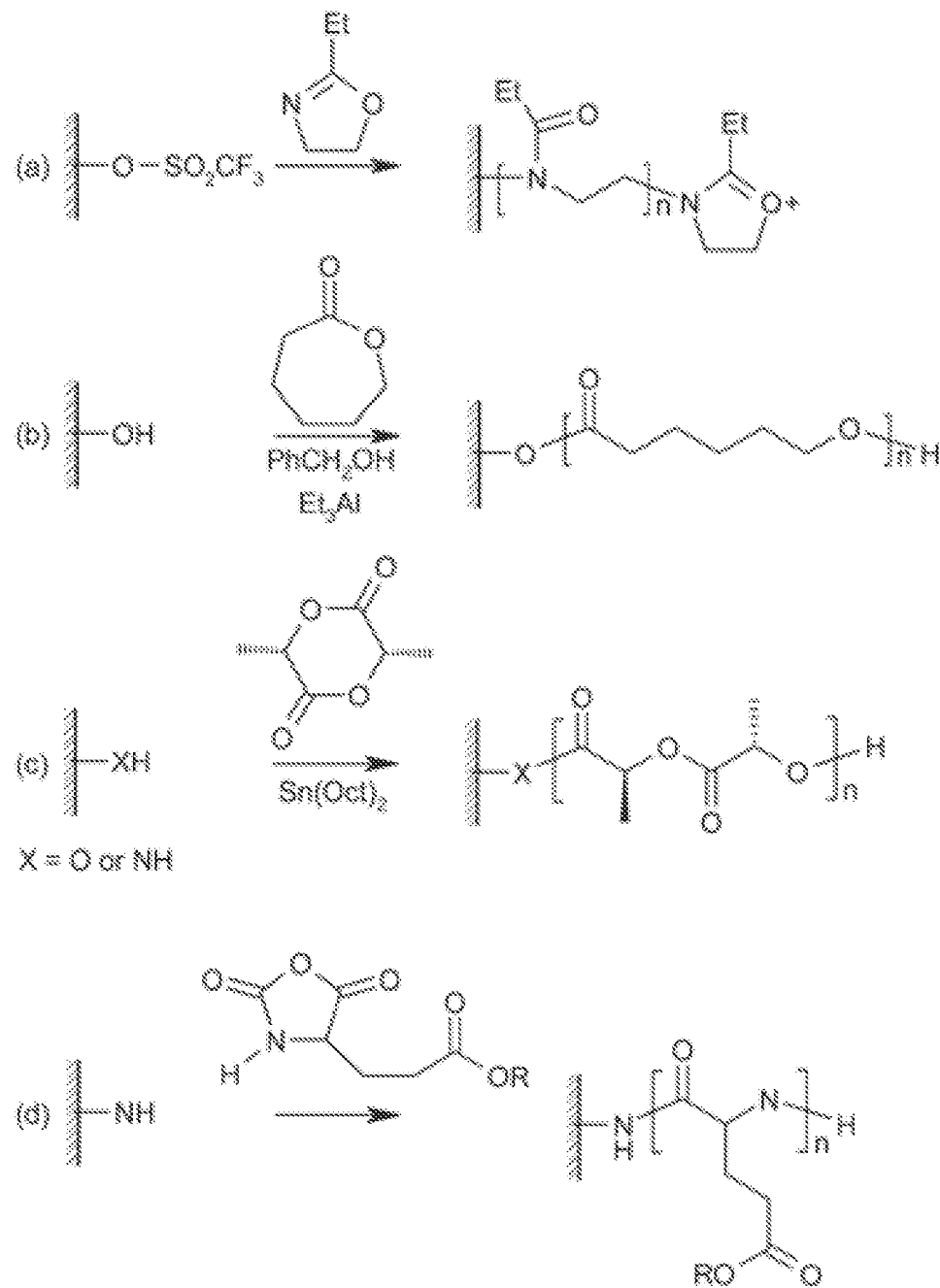
FIG. 8 illustrates four representative embodiments (a-d) of polymer brushes grown from a lignin particle via ring opening polymerization (ROP) of cyclic monomers.

Surface-initiated ring opening polymerization (ROP) of cyclic monomers, such as lactide and caprolactone, may, for example, be carried out using a stannous octanoate catalyst. FIG. 8 illustrates examples (a-d) of polymer brushes grown by (ROP), extended to lignin-polymer composite materials.

Figure 9:
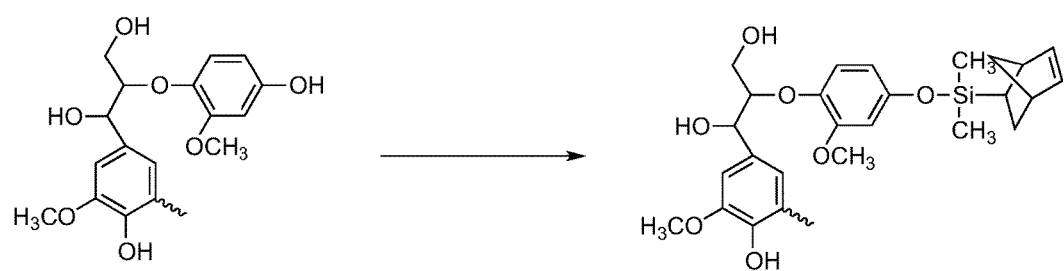
FIG. 9 illustrates a representative embodiment of a lignin-based ring-opening metathesis polymerization (ROMP) macroinitiator.

Ring-opening metathesis polymerization (ROMP) may also be used to catalyze polymerization to achieve polymer-grafting from lignin. In this approach, a ruthenium catalyst is covalently attached to the surface, and polymerization of strained monomers, such as nornbornene, proceeds and can include a range of substituents. FIG. 9 illustrates an example of a lignin-based ROMP macroinitiator.

Figure 10:
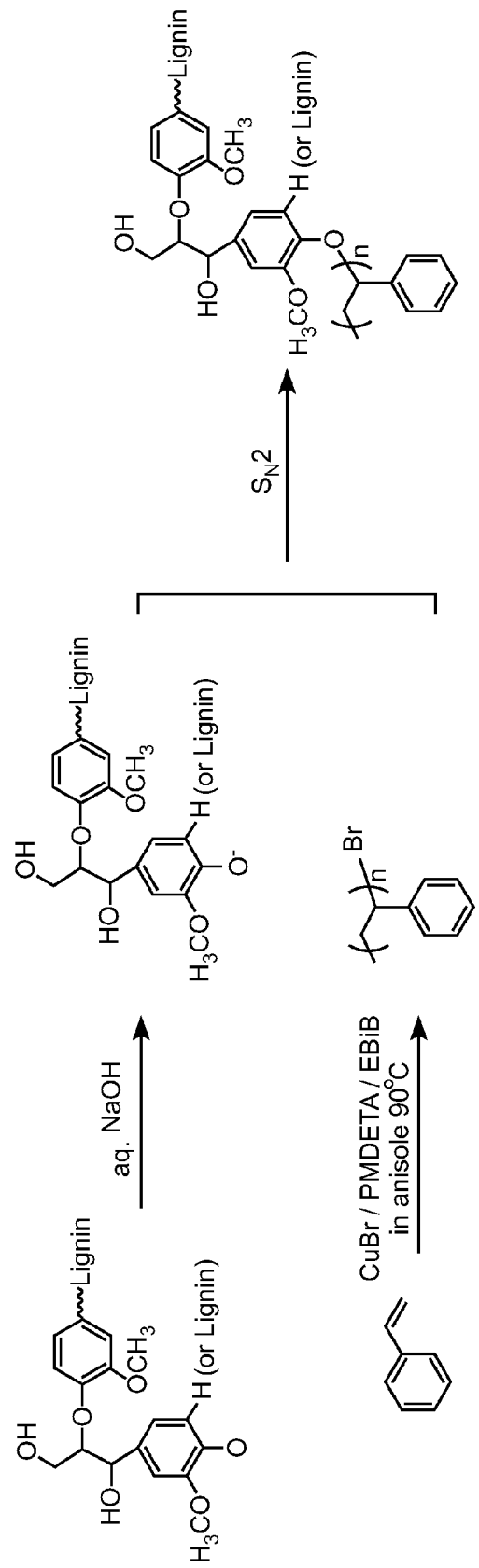
FIG. 10 illustrates an embodiment of a grafting onto approach for synthesizing polymer-grafted lignin wherein polystyrene is grafted onto lignin.
Figure 11:
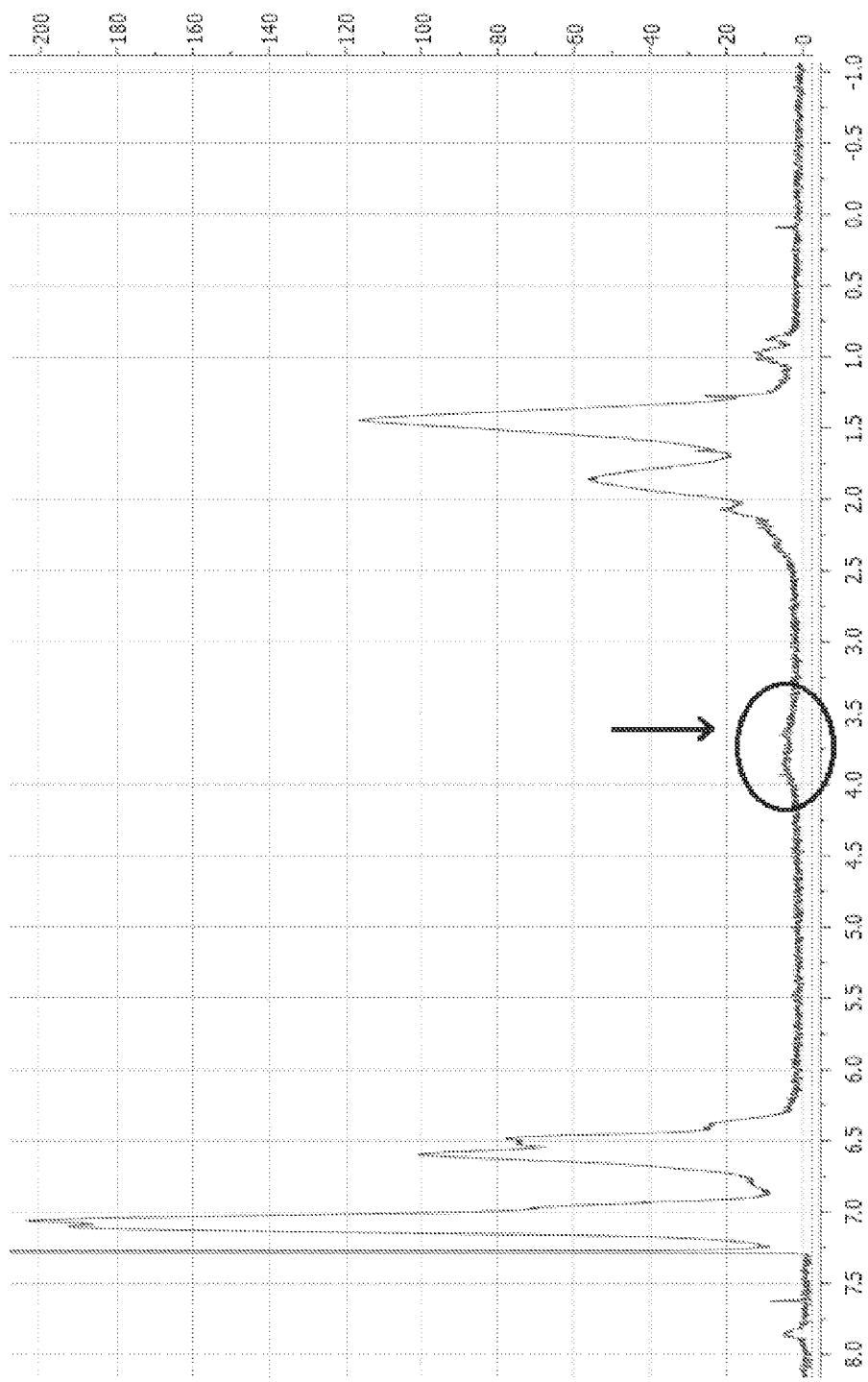
FIG. 11 illustrates an NMR spectrum of a polystyrene-grafted lignin formed in a grafting onto synthetic scheme.

As described above, grafting-onto procedure can also be used to form polymer-grafted lignin. CRP may, for example, be used to prepare the polymers for grafting onto a lignin core. As described above, CRP provide methods of forming polymers with a high degree of (and varying) end functionalization. In a representative example, the conjugation of lignin with polystyrene is illustrated in FIG. 10. Polystyrene may, for example, be synthesized from the styrene monomer using a CRP such as ATRP with a copper catalyst. In a number of embodiments, the initiator is ethyl-2-bromoisobutyrate (EBiB), which leaves a terminal bromine on the polymer. Lignin may be deprotonated in aqueous solution leaving the phenoxide group as shown in FIG. 10. When stirred together in solution, the phenoxide displaces the terminal bromine (or another electrophilic functional group) via an $S_N2$ reaction that results in the final lignin-based material. The NMR produced from the solids obtained after the reaction of the lignin phenoxide salt with the polystyrene is shown in FIG. 11. The proton highlighted in FIG. 11 is that adjacent to the terminal group. In the original synthesized polystyrene, that proton is seen at a chemical shift of about 4.5 ppm. In this product, the obtained chemical shift transitions to about 3.75 ppm. This shift is consistent with a proton on a carbon directly adjacent to an oxygen. Further support for this product comes from GPC data. The GPC indicates that a product with a molecular weight of 108,520 Da was formed as compared with native lignin with an $M_n$ of 25,000 g/mol and the polystyrene used for the coupling with an $M_n$ of 18,276 g/mol.

Figure 12:
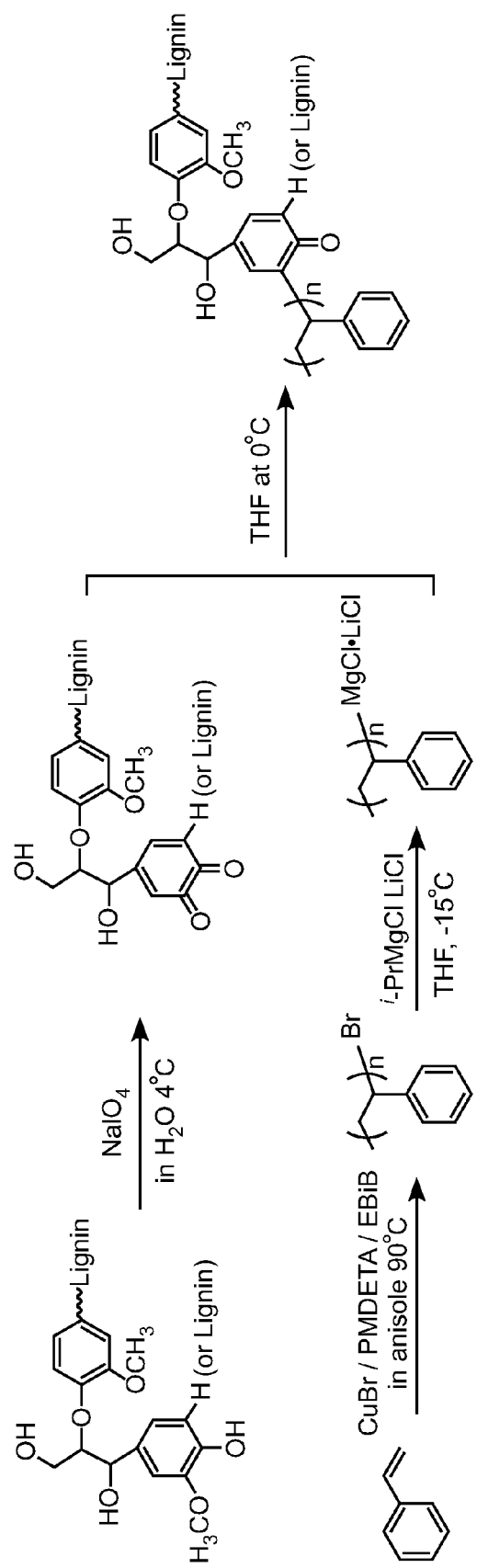
FIG. 12 illustrates a representative embodiment of grafting a Grignard-modified polymer (polystyrene) onto lignin.

In another example of a grafting onto approach, conjugation occurs via, for example, Grignard-modified polystyrene. Polystyrene may, for example, again be synthesized via ATRP using a copper catalyst with ethyl 2-bromoisobutyrate (EBiB) as the initiator, leaving the terminal bromine. Lignin is oxidized after reacting with sodium periodate, forming an ortho-quinone functionality. Bromine-terminated polystyrene may be reacted with a turbo Grignard to produce a Grignard reagent. The desired lignin-based material may be synthesized by reacting the Grignard-modified polystyrene with the oxidized lignin. The product species may, for example, be formed by attack of the Grignard on one of the susceptible carbonyl carbons as, for example, illustrated in FIG. 12.

Figure 13:
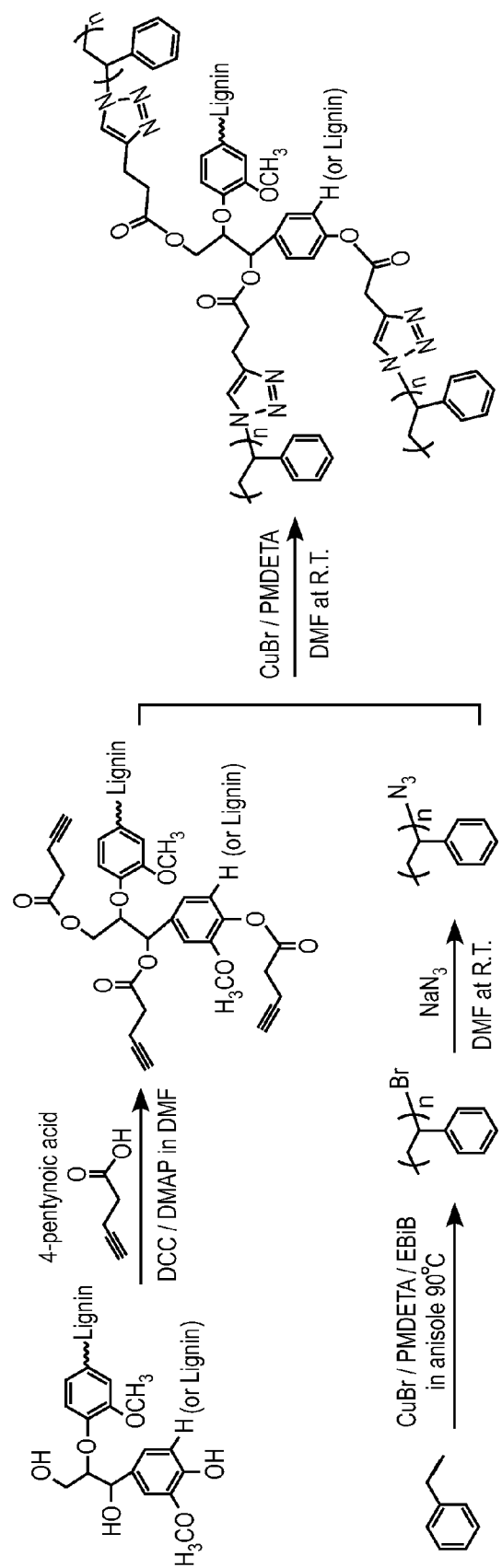
FIG. 13 illustrates a representative embodiment of a grafting onto approach in which a click coupling (for example, via copper-catalyzed Huisgen cycloaddition of an alkyne and azide) is used to form polymer-grafted lignin.
Figure 14:
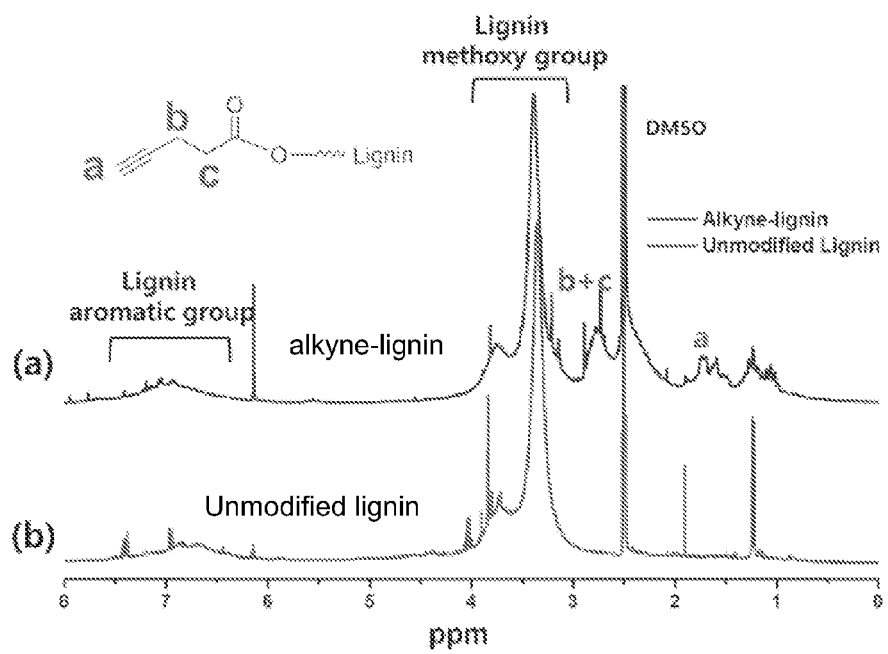
FIG. 14 illustrates the $^1$H NMR (in DMSO-d6) spectra of (a) an alkyne-functionalized lignin and (b) unmodified lignin.
Figure 15:
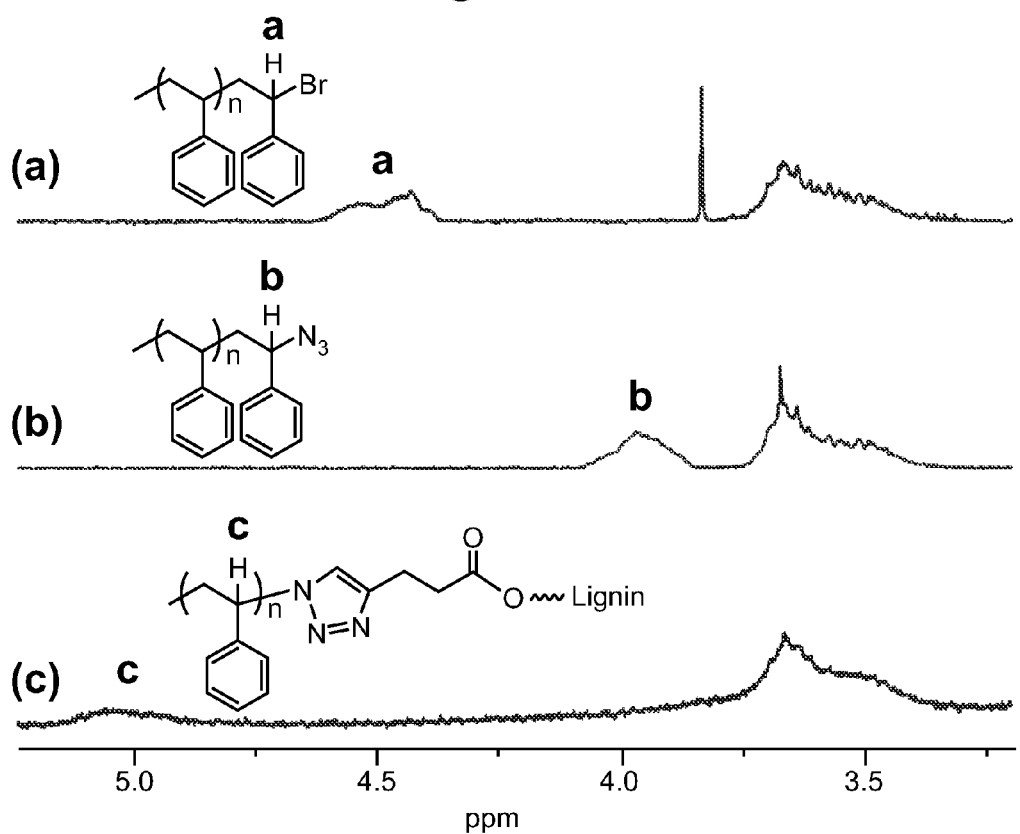
FIG. 15 illustrates the $^1$H NMR spectra of (a) polystyrene prepared through ATRP (b) terminal azide-functionalized polystyrene and (c) lignin-graft-polystyrene following azide-alkyne cycloaddition.

In another example of a grafting onto approach, a click coupling (for example, via copper-catalyzed Huisgen cycloaddition of an alkyne and azide), is used to form polymer-grafted lignin. One approach was to functionalize lignin with an alkyne and the polymer terminus with an azide. ATRP may, for example, be used to prepare a polymer with a terminal bromine that can be substituted by reaction with sodium azide, and lignin can be functionalized with an alkyne by reacting with 4-pentynoic acid using of N,N'-dicychlohexylcarbodiimide (DCC) and 4-dimethylaminopyridine (DMAP) in DMF to form an ester linkage (see FIG. 13). The alkyne-functionalized lignin was characterized by $^1$H NMR in DMSO-d6 as illustrated in FIG. 14. This spectrum was compared to unmodified polymer. It was found that the newly introduced ester groups adjacent to the —$CH_2CH_2$— group were observed at 2.7 ppm (spectrum (a) in FIG. 14). In addition, protons from the alkyne group at 1.7 ppm can also be observed in spectrum (a) of FIG. 14. The alkyne group concentration per unit weight of lignin was calculated by addition of and internal standard for $^1$H NMR, pentafluorobenzaldehyde (PFB). The PFB signal at 10.1 ppm is not shown in FIG. 14. The resulting concentration of alkyne group was $2.22 \times 10^{-3}$ mmol/mg. The success of graft copolymer formation via click chemistry was also supported with $^1$H NMR characterization. FIG. 15 shows the $^1$H NMR spectra of (a) Polystyrene prepared through ATRP (b) terminal azide-functionalized polystyrene and (c) lignin-graft-polystyrene following azide-alkyne cycloaddition. Signal changes for the same terminal proton is observed across all spectra on the $^1$H NMR spectra. The clear and consistent change in signal of the terminal proton at each step demonstrates completion of the reactions without any starting materials remaining.

Figure 16:
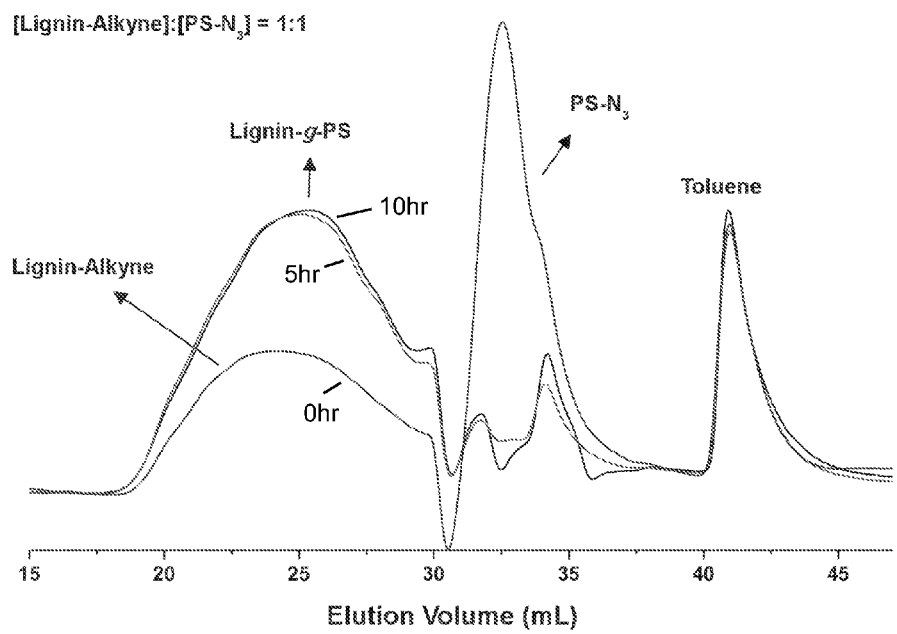
FIG. 16 illustrates GPC traces corresponding to three different reaction times: 0 hours, 5 hours and 10 hours during grafting of polystyrene onto lignin via cycloaddition between an alkyne and an azide.

An equimolar ratio of alkyne groups on the lignin to azide groups on the polystyrene was used to graft polystyrene onto lignin. As shown in FIG. 13, the reaction occurred in the presence of copper catalyst in DMF. Toluene was added as an inert internal standard for GPC analysis. The cycloaddition between alkyne and azide was monitored via GPC analysis with a DMF eluent. FIG. 16 shows GPC traces corresponding to three different reaction times: 0 hours, 5 hours and 10 hours. At 0 hours, the alkyne-functionalized lignin and azide-functionalized polystyrene shows trace peaks at elution volumes of 25 mL and 32 mL, respectively. These two separated traces demonstrate that alkyne-functionalized lignin and azide-functionalized polystyrene exist in solution as a mixture prior to any chemical reactions as shown in blue in FIG. 16. At 5 hours, the intensity of alkyne-functionalized lignin trace showed a significant increase, whereas the azide-functionalized polystyrene trace showed a decrease. The GPC trace did not change significantly after 10 hours. In addition, according to the GPC trace, most of the azide functionalized polystyrene was consumed over time. Together, those results indicated that a cycloaddition reaction occurred between the azide-functionalized polystyrene and alkynefunctionalized to form a graft copolymer via a "graft onto" method. If all azide and alkyne groups reacted with each other, the lignin-graft-polystyrene would contain 72 weight % polystyrene.

GPC analysis of the lignin-graft-polystyrene showed a $M_n$ of 28,000 g/mole and a polydispersity index or PDI of 2.0. The increased $M_n$ of the lignin-graft-polystyrene compared to that of native lignin supports the existence of grafted polystyrene on lignin. The graft copolymerization of well-defined polystyrene (that is, low-PDI polystyrene) onto lignin yielded a lower PDI than that of native lignin (2.4). In the case of polymers such as polystyrene that form foams, lignin grafting may, for example, be used to provide further control over the engineering of foams having determined physiochemical and/or mechanical/structural characteristics.

Figure 17:
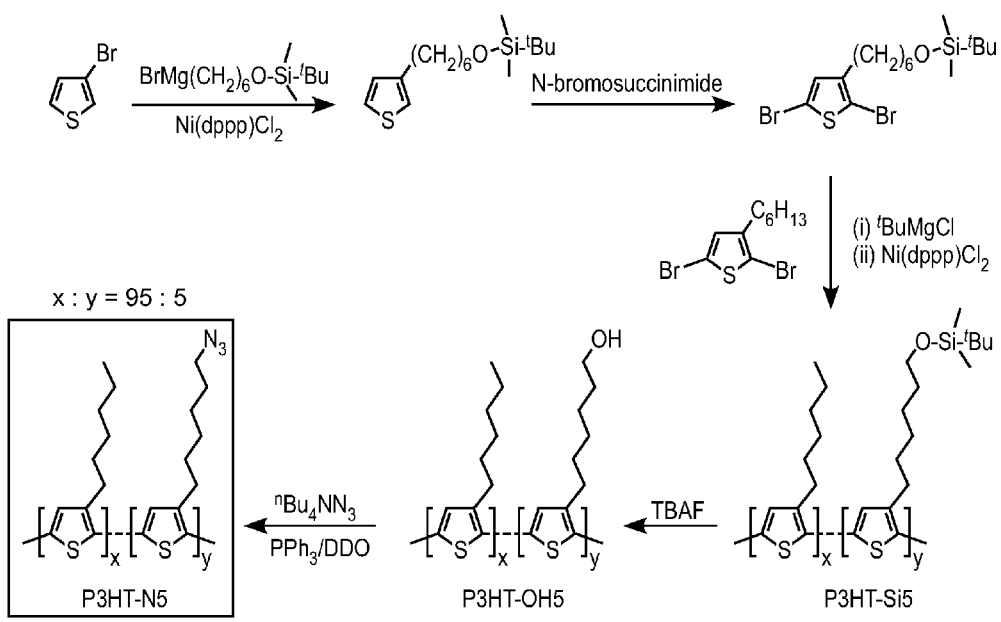
FIG. 17 illustrates a representative example of Grignard metathesis (GRIM) polymerization used to prepare poly(3-hexyl thiophene) with terminal functional groups.

Other polymer chemistries may be used to produce polymers amenable to grafting onto methodologies. A representative example is Grignard metathesis (GRIM) polymerization. GRIM polymerization may, for example, be used to prepare poly(3-hexyl thiophene) with terminal amines that can be used to form amide bonds with lignin carboxylic acid groups, or with pendant azide groups that can be used to couple to alkyne-functionalized lignin via click reactions (see FIG. 17).

Figure 18:
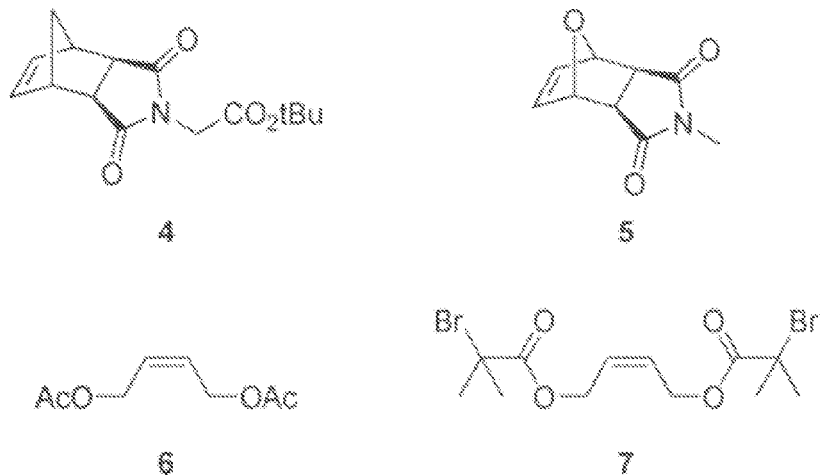
FIG. 18 illustrates tert-butyl ester norbornene imide (tBENI) (4) and N-methyloxanorbornene imide (NMONI) (5) capped by cis-olefin termination agents with reactive functional groups, such as acetate (6) and α-bromoesters (7), which may be used to make polymers for grafting onto lignin.
Figure 18:
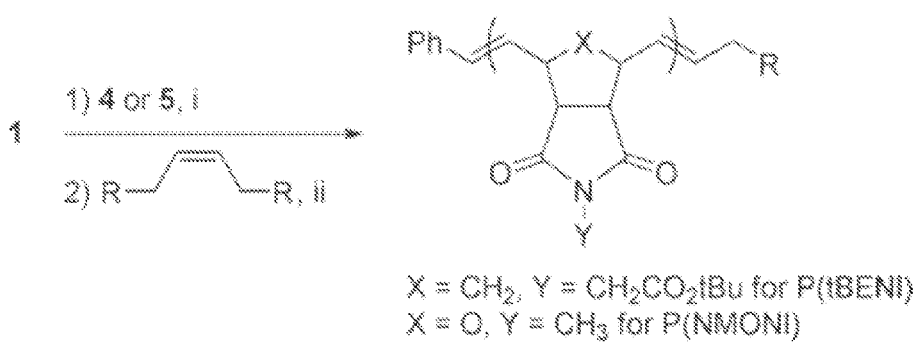

Ring opening metathesis polymerization may also be used to prepare polymers with reactive groups. With reference to FIG. 18, tert-butyl ester norbornene imide (tBENI) (4) and N-methyloxanorbornene imide (NMONI) (5) capped by cis-olefin termination agents with reactive functional groups, such as acetate (6) and α-bromoesters (7), may, for example, be polymerized. Those and other functionalization groups may, for example, be used to make polymers capable of grafting onto lignin.

Polymers that are hydrophilic or hydrophobic may, for example, be used to disperse a polymer-grafted lignin in an aqueous or non-aqueous (or oleophilic/hydrophobic) matrix or medium, respectively. The polymer-grafted lignin may provide characteristics of lignin (for example, antioxidant properties) to the matrix or medium. Moreover, the affinity of lignin for a wide variety of components can assist in dispersing one or more such components in the matrix or medium via interaction with the lignin core of the polymer-grafted lignin.

Figure 19:
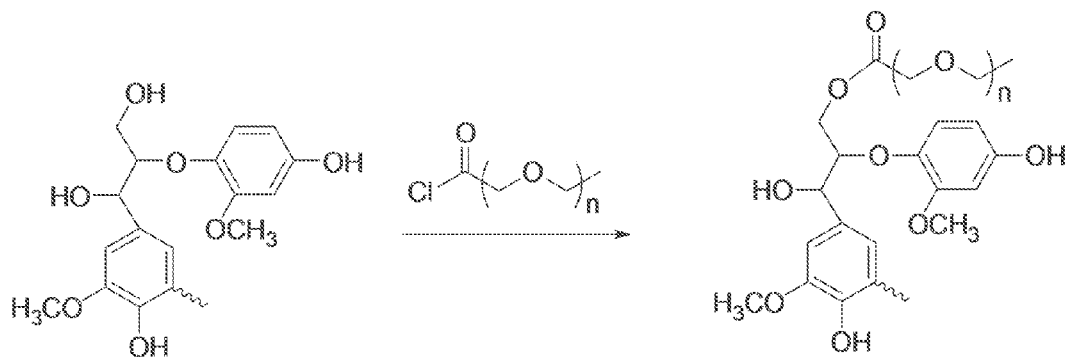
FIG. 19 illustrates an embodiment of a synthetic scheme for grafting an hydrophilic polymer such as polyethylene glycol onto lignin.

Lignin may, for example, be functionalized with poly (ethylene glycol) (PEG), sometimes referred to as PEGylation, to create a dispersant for aqueous media. PEG is known to be soluble in water, and functionalization of lignin with PEG can result in an effective dispersant in aqueous media that utilizes the high affinity lignin has for a broad range of chemical components or species. PEG-grafted lignin compounds may, for example, be prepared in a number of ways. One example is shown in FIG. 19 in which lignin is reacted with a methyl-terminated, acyl chloride-functionalized PEG, which can result in an ester linkage between the lignin and PEG. In FIG. 19, the reaction is shown at a primary alcohol on lignin, but the reaction could occur at a secondary alcohol or at a phenol.

EXPERIMENTAL

Materials.

Lignin was purchased from TCI America (Seekonk, Mass.; TCI product number: L0082, softwood lignin). Prior to the experiment, lignin was washed with 2 M aqueous HCl solution and dried in vacuum oven for overnight. Hydroxyl group concentration of lignin was determined by acetylation of hydroxyl group followed by $^1$H NMR characterization. Briefly, lignin (200 mg) was dissolved in 4 ml of pyridine and then 4 ml of acetic anhydride was added to the lignin-pyridine solution. The reaction mixture was stirred for 48 hours at room temperature. After 24 hours, the resulting solution was slowly added to the deionized (DI) water to precipitate acetylated lignin product. The precipitate was recovered by vacuum filtration and then dried in vacuo for overnight. The obtained solid was characterized by $^1$H NMR in CDCl$_3$ with internal standard, pentafluorobenzaldehyde. Methyl methacrylate, styrene, polymerization reagents, and solvents were purchased from Aldrich Chemical Co. (Milwaukee, Wis.) and used as received.

Preparation of Lignin-Based Macroinitiator.

Lignin (1 g) and pyridine (20 g) were mixed and stirred until they become homogeneous solution. The resulting solution mixture was placed in an ice bath while 2-bromoisobutyryl bromide solution in dry THF was added slowly. The reaction mixture was then stirred for 24 hours at room temperature. Next, DI water (10 mL) was added under vigorous stirring to quench the unreacted reagent, 2-bromoisobutyryl bromide. After 15 minutes, the solution was dried using a rotary evaporator to remove remaining solvents and liquid reagents. The resulting dark yellow viscous solution was dissolved in 1,4-dioxane (15 mL) for the second precipitation. The solution was very slowly added to the saturated aqueous NaHCO$_3$ solution. Note that if the solution is added too fast the mixed solution generates large bubbles with strong heat. The precipitate was recovered by vacuum filtration. The product was dried in vacuum for 3 hours at 40° C. and then purified over diethyl ether once more. The final product was dried in vacuo overnight at 40° C.

Graft Copolymerization (ATRP) of Styrene and n-Butyl Acrylate from Lignin-Based Macroinitiator.

In a Schlenk flask, CuBr (22.2 mg), bipyridine (70 mg) and lignin-based macroinitiator (50 mg) were placed. Next, a Schlenk flask with the solid reagents was repeatedly vacuumed and backfilled with dry nitrogen for three times. Degassed styrene (2.33 g) and dimethylformamide (DMF) (2 ml) were transferred to the solid reagent containing Schlenk flask. The first kinetic sample was taken prior to place the reaction mixture in the 100° C. oil bath. The polymerization was stopped by removing heat followed by exposure the reaction solution in the air. The polymer solution was filtered through neutral alumina filled column to remove copper. The resulting filtrate polymer solution was added slowly into methanol to precipitate final product. The polymer was dried in vacuum overnight at room temperature. Then methyl methacrylate was graft copolymerized via ATRP onto lignin with the same synthetic method used in polystyrene grafting, CuBr/PMDETA and reaction temperature 70° C.

Synthesis of Polystyrene Via ATRP.

Polymerization of styrene to polystyrene was carried out via ATRP using a CuBr/PMDETA catalyst system. To a 100-mL Schlenk flask containing a magnetic stirring bar, 175 mg of CuBr were placed. Both openings of the flask were sealed with rubber septums and electrical tape. The flask was then degassed under vacuum, followed by nitrogen gas. The remaining reagents: anisole (solvent), N,N,N',N',N"-pentamethyldiethylenetriamine (PMDETA, ligand), EBiB (initiator), and styrene (monomer) were also degassed in a similar manner. A syringe purged of oxygen was then used to draw the necessary volume of reagents: 1 mL of anisole, 250 µL of PMDETA, 352.2 µL of EBiB, and 5.5 mL of styrene. The syringes were then quickly placed through the Schlenk flask sidearm and added to the reaction mixture. The reagents were added in the following order: anisole, PMDETA, styrene, and EBiB, with stirring of the flask after each addition. Following addition of the initiator, all needles were removed and the Schlenk flask was sealed. The flask was placed in an oil bath heated to 90° C. and left to stir for 2 hours. Following, the mixture was allowed to cool and was then filtered through a 10-mL syringe that was filled with about 7 mL of neutral alumina in order to remove the copper. The filtrate was precipitated in about 10× the amount of ice-cold methanol. The mixture was vacuum filtered to collect the solids, which were subsequently placed in another vial and dried in a vacuum oven at room temperature for at least 3 hours. Longer polystyrene chains were obtained by decreasing the amount of EBiB used in the reaction. The procedure was repeated to obtain a stock of polymer, with the same amounts of reagents, with one procedure using 69 µL of EBiB to increase the chain length. The molecular weight and dispersity of the polymer chains were characterized using GPC. About 50 mg of synthesized polymer was dissolved in about 1 mL HPLC-grade DMF. This solution was filtered through a Teflon filter. Subsequently, 1 drop of toluene was added. The solution was then placed into a GPC vial for analysis. Polymers were also characterized via $^1$H NMR in CDCl$_3$.

Preparation of Azide Functionalized Polystyrene.

Two steps were required to synthesize the azide-functionalized polystyrene. Bromineterminated polystyrene was prepared via ATRP of styrene, as detailed above. A substitution reaction was used to convert the terminal bromine to an azide. The bromine-terminated polystyrene (2 g) was dissolved in about 13 mL of DMF and mixed with sodium azide (221 mg). The heterogeneous mixture was stirred for 14 hours at room temperature. The resulting solution was slowly added to a mixture containing 300 mL methanol and 60 mL water to form a precipitate of the azide-terminated polystyrene. Presence of the azide was determined by $^1$H NMR in CDCl$_3$.

Pre-Coupling Lignin Modifications.

Formation of Lignin Phenoxide Salt.

Precipitation of a Na+-lignin phenoxide salt was attempted. TCI lignin A (unmodified/unacidified, 200 mg) was dissolved in pH 10-11 water. The solution was sonicated for about 15 minutes to fully dissolve the solids. A small portion of the mixture was then added dropwise to three solvents (acetone, methanol, and THF) to test solubility and see which would cause the salt to crash out of solution. Unlike the former two, solid precipitated out of solution in THF. The remaining solution was thus added dropwise to about 300 mL THF at room temperature. A suspension of dark brown, almost black, solids were observed. Portions of the mixture were placed into 50 mL centrifuge tubes and the mixture was centrifuged to collect the solids.

Lignin Oxidation with Sodium Periodate.

Sodium periodate (1.6004 g) was measured into a 20-mL glass vial and dissolved in 12 mL millipore water. The solution was placed in a fridge at 4° C. and left to cool until 4° C. While cooling, lignin (dealkaline, unmodified; 800 mg) was measured into another vial. The cooled NaIO4 solution was taken from the fridge, redissolved, and added to the lignin. The solution was homogenized well and was left stir in the dark at 4° C. for 48 hours. The resulting solids were then filtered, collected, and dried in a vacuum oven overnight. Reaction conversion was characterized by UV-Vis spectroscopy and $^1$H NMR.

Preparation of Alkyne Functionalized Lignin.

Lignin (1 g), N,N'-dicychlohexylcarbodiimide (DCC, 4.73 g) and 4-pentynoic acid (2.25 g) were mixed in DMF (25 mL). The reaction mixture was cooled in an ice bath. Then 4-dimethylaminopyridine (DMAP, 140 mg) dissolved in 2 mL of DMF was added slowly to the cooled solution. This mixture was stirred for 40 hours at room temperature. The resulting suspension was vacuum-filtered to separate the white solid from the dark brown solution. The filtrate solution was then added dropwise to aqueous HCl (pH 1.0) to precipitate a light brown pulp-like solid. The solid was isolated from the liquid via vacuum filtration and dried in a vacuum oven at room temperature for 3 hours. The dry product was dissolved in methylene chloride again and then precipitated over hexane. The solid precipitate was stirred vigorously through ultrasonication for an hour in the hexane. The final product was recovered by vacuum filtration followed by drying in the vacuum oven overnight at room temperature. The synthesized alkyne functionalized lignin was characterized by $^1$H NMR in DMSO-d6 with 10 µL of pentafluorobenzaldehyde as an internal standard to determine the concentration of alkyne group.

Coupling of Lignin to Polystyrene.

$S_N2$ Displacement of Chain-Terminating Bromine with Lignin Phenoxide.

Many strategies were tested using this lignin phenoxide method. The first method employed a "one-pot" reaction. First, TCI lignin A (100 mg) was added to a 20-mL vial. Enough DMF was added to dissolve the lignin with sonication employed as necessary. Next, 2M aqueous NaOH was added dropwise while stirring until a pH of 10 was reached. Polystyrene (20 mg) was measured and also dissolved in a minimum amount of DMF. The lignin solution was placed in an oil bath heated to 50° C. Then, the polystyrene was added dropwise. Reactions were left to stir. Samples were collected after 1 hr., and 2 hrs. Workup of the reaction mixture involved addition of 2M HCl until a pH of 2 was reached.

The other method involved the precipitation of a lignin-phenoxide sodium salt. This began with dissolving TCI lignin A (200 mg) in pH 11 water reached by using 1M NaOH. The solution was sonicated for about 15 minutes to ensure full dissolution. Solubility tests were performed on the solution to determine an appropriate solvent for precipitation of the salt. THF was chosen as a suitable solvent. The remaining solution was added dropwise to 300 mL THF. The dark brown, almost black, solids were collected via centrifugation. A similar procedure as detailed above was attempted using these new solids. With the salt, dissolving in basic water is no longer necessary. Instead, the lignin phenoxide salt was dissolved in DMF and mixed with a sample of polystyrene, also dissolved in DMF. However, the lignin phenoxide salt did not dissolve in the DMF, even minimally. This was after addition of 2 mL DMF to approximately 50 mg of the salt. As a result, two solid-state reactions were carried out using this phenoxide salt. Polystyrene was added to the DMF-lignin salt mixture and left to stir at room temperature for about a week (AA66: 47.5 mg salt, 30.5 mg polystyrene). A second solid-state "solventless" reaction was also carried out (AA67). Polystyrene (130.1 mg) was added to a 20 mL vial until the bottom surface of the vial was almost entirely covered. The phenoxide salt (40.2 mg) was added to the polystyrene vial followed by the addition of 4-5 drops of DMF. The mixture was vortexed and shaken to obtain an even distribution of the salt over the polystyrene. This mixture was left in an oil bath at 80° C. without stirring for a week. 1 mL of 6 M HCl was then added to both vials to ensure acidification. Methylation procedures were then carried out by adding 2 mL each of acetic anhydride and pyridine to each vial (AA66 and AA67). Those mixtures were left to stir for 48 hours. The reaction mixtures from each vial were added independently to about 150 mL of ice water. The resulting mixture was then poured into several centrifuge tubes and centrifuged to collect the solids. Because some solids were difficult to obtain, a little bit of the liquid was reserved to obtain them in suspension. Some residual solids were also left in each vial, those were collected separately.

Reaction of Periodate Lignin with Grignard-Modified Polystyrene.

A 25-mL RBF equipped with a stir bar was sealed with a septum top, placed under vacuum, and then pumped with nitrogen. After all air has been removed, 1 mL (1.3 mmol) of a 1.3 M solution of iPrMgCl.LiCl in THF was added. The flask was then cooled to −15° C. Polystyrene (200 mg) was dissolved in a minimum amount of THF and then added to the reaction flask. The temperature was raised to −10° C. This Grignard modification reaction was left to run for 25 minutes. Previously synthesized periodate lignin (110 mg) was dissolved in a minimum amount of THF and added to the reaction flask. The mixture was left to stir for 2 hours at 0° C. The reaction was quenched by the addition of 4 mL of a saturated aqueous solution of NH4Cl. The aqueous phase was extracted with 3×4 mL portions of ether. The organic layer was dried with sodium sulfate. The product was concentrated using rotary evaporation.

Preparation of Lignin-Graft-Polystyrene Via Click Chemistry.

Previously synthesized azide-functionalized polystyrene (92 mg), alkyne-functionalized lignin (35 mg), and CuBr (5.6 mg) were placed in a Schlenk flask. The flask was placed under vacuum and then filled with nitrogen gas three times to generate an inert atmosphere. Next, 1.5 mL DMF, 50 µL, and 8.1 µL PMDETA were added in that order to the Schlenk flask using nitrogen-purged syringes. The reaction mixture was stirred for 10 hours at room temperature. Reaction progress was checked at 5 hours and 10 hours of reaction via DMF eluent GPC. After the designated reaction time, the resulting solution was exposed to air and filtered through a neutral alumina packed column to remove copper. The solution was added dropwise to methanol in order to precipitate the lignin-graft-polystyrene. The final product was dried in a vacuum oven overnight at room temperature. The chemical structure was determined by $^1$H NMR in $CDCl_3$.

$^1$H NMR Characterization.

All lignin, lignin-based materials, polystyrene, and graft copolymers were characterized by $^1$H NMR (Bruker Avance 300). Deuterated chloroform ($CDCl_3$) and deuterated dimethyl sulfoxide (DMSO-d6) were used as solvents for synthesized materials.

GPC Characterization.

Molecular weight and polydispersity index of polymer samples were analyzed by Waters GPC (Polymer Standards Services (PSS) columns (guard, 105, 103, and 102 Å)) using THF and DMF as an eluent with differential refractive index (RI) detector (Waters 2410). For THF eluent GPC flow rate was 1.0 mL/min at 25° C. and DMF eluent GPC's flow rate was 0.8 mL/min at 50° C. The apparent molecular weights ($M_n$) and polydispersities ($M_w/M_n$) were determined with a calibration based on linear polystyrene standards using WinGPC 7.0 software from PSS.

The foregoing description and accompanying drawings set forth a number of representative embodiments at the present time. Various modifications, additions and alternative designs will, of course, become apparent to those skilled in the art in light of the foregoing teachings without departing from the scope hereof, which is indicated by the following claims rather than by the foregoing description. All changes and variations that fall within the meaning and range of equivalency of the claims are to be embraced within their scope.

What is claimed is:

1. A method of dispersing a component in a matrix, comprising: adding an agent to the matrix, the agent being formed by reacting at least one molecule of a first polymer comprising single terminal reactive group with a group on a lignin core comprising a single lignin particle to graft at least one chain of the first polymer onto the lignin core so that the agent comprises the lignin core and a corona comprising the at least one chain of the first polymer, the first polymer having an affinity for the matrix, lignin having an affinity for the component, wherein the component is other than the agent, lignin or the first polymer, and contacting the matrix with the component.

2. The method of claim 1 wherein the first polymer is formed via controlled radical polymerization.

3. The method of claim 1 wherein the first polymer is formed via atom transfer radical polymerization (ATRP), nitroxide-mediated polymerization (NMP), reversible addition fragmentation chain transfer (RAFT) and catalytic chain transfer (CCT), ring-opening polymerization (ROP) or ring-opening metathesis polymerization (ROMP).

4. The method of claim 1 wherein the matrix is a non-polymeric matrix.

5. The method of claim 4 wherein the non-polymeric matrix is a solid matrix, a liquid matrix or a multiphase matrix.

6. The method of claim 4 wherein the non-polymeric matrix is an aqueous matrix and the first polymer is a hydrophilic polymer or the non-polymeric matrix is an oleophilic matrix and the first polymer is a hydrophobic polymer.

7. The method of claim 6 wherein the matrix is an aqueous matrix and the first polymer is a hydrophilic polymer.

8. The method of claim 7 wherein the hydrophilic polymer is a polyalkylene oxide.

9. The method of claim 8 wherein the hydrophilic polymer is a polyethylene glycol.

10. The method of claim 7 wherein the matrix and the agent forms a dispersing agent for use in subterranean hydrocarbon recovery.

11. The method of claim 1 wherein the agent is formed by reacting a terminal reactive group of each of a plurality of the first polymer with one of a plurality of groups on the lignin core to graft a plurality of chains of the first polymer onto the lignin core so that the agent comprises the lignin core and the corona comprises the plurality of chains of the first polymer extending from the corona core.

* * * * *